(12) United States Patent
Smirnov

(10) Patent No.: US 7,706,614 B2
(45) Date of Patent: *Apr. 27, 2010

(54) SYSTEM AND METHOD FOR IDENTIFYING TEXT-BASED SPAM IN RASTERIZED IMAGES

(75) Inventor: Evgegy P. Smirnov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 339 days.

This patent is subject to a terminal disclaimer.

(21) Appl. No.: 12/025,697

(22) Filed: Feb. 4, 2008

(65) Prior Publication Data

US 2010/0008569 A1    Jan. 14, 2010

Related U.S. Application Data

(63) Continuation of application No. 11/844,081, filed on Aug. 23, 2007.

(51) Int. Cl.
G06K 9/18 (2006.01)

(52) U.S. Cl. ............ 382/182; 382/187; 382/199

(58) Field of Classification Search ............... 382/182
See application file for complete search history.

(56) References Cited

U.S. PATENT DOCUMENTS

| | | | | |
|---|---|---|---|---|
| 5,216,725 A * | 6/1993 | McCubbrey | ............ | 382/102 |
| 5,321,770 A * | 6/1994 | Huttenlocher et al. | ....... | 382/174 |
| 5,369,714 A * | 11/1994 | Withgott et al. | ............. | 382/177 |
| 5,390,259 A * | 2/1995 | Withgott et al. | ............. | 382/173 |
| 5,410,611 A * | 4/1995 | Huttenlocher et al. | ....... | 382/177 |
| 5,438,630 A * | 8/1995 | Chen et al. | ................. | 382/159 |
| 5,455,871 A * | 10/1995 | Bloomberg et al. | ......... | 382/173 |
| 5,485,566 A * | 1/1996 | Rahgozar | .................... | 715/200 |
| 5,491,760 A * | 2/1996 | Withgott et al. | ............. | 382/203 |
| 5,539,841 A * | 7/1996 | Huttenlocher et al. | ....... | 382/218 |
| 5,592,568 A * | 1/1997 | Wilcox et al. | ............... | 382/218 |
| 5,848,191 A * | 12/1998 | Chen et al. | ................. | 382/229 |
| 7,305,612 B2 * | 12/2007 | Chakraborty | ............... | 715/221 |
| 2005/0216564 A1 * | 9/2005 | Myers et al. | ................ | 709/206 |
| 2006/0215230 A1 * | 9/2006 | Borrey et al. | ............... | 358/448 |
| 2007/0027749 A1 | 2/2007 | Peiro | | |

* cited by examiner

*Primary Examiner*—Sath V Perungavoor
(74) *Attorney, Agent, or Firm*—Bardmesser Law Group

(57) ABSTRACT

A system, method and computer program product for identifying spam in an image, including (a) identifying a plurality of contours in the image, the contours corresponding to probable symbols; (b) ignoring contours that are too small or too large; (c) identifying text lines in the image, based on the remaining contours; (d) parsing the text lines into words; (e) ignoring words that are too short or too long from the identified text lines; (f) ignoring text lines that are too short; (g) verifying that the image contains text by comparing a number of pixels of a symbol color within remaining contours to a total number of pixels of the symbol color in the image, and that there is at least one text line after filtration; and (h) if the image contains text, rendering a spam/no spam verdict based on a contour representation of the text that which appears after step (f).

12 Claims, 55 Drawing Sheets

*ATTENTION ALL DAY TRADERS AND INVESTORS*

INVESTOR ALERT!
IT LOOKS LIKE ANOTHER RUN FOR SWNM!
WATCH SWNM LIKE A HAWK ON Monday July 31, 2006

Company Name: SOUTHWESTERN MEDICAL, INC.
Stock Symbol: SWNM
Friday Close: 0.09
Market Cap: $33,000,000.00 (Approx)

SWNM RELEASES BREAKING NEWS!
Southwestern Medical Solutions, Inc. (PINKSHEETS: SWNM),
is pleased to announce that it has entered into the formal stages
of negotiations regarding Pacific Rim nations distribution for its
proprietary Labguard(TM) product line.

During the last 3 months, Southwestern Medical has held discussions,
gathered data, and explored the prospective licensing of its Labguard(TM)
diagnostic system, to be sold through internationally based distribution
companies into Pacific Rim areas. The initial interest has been for the sale
of the product for government employee testing programs such as police
forces, local and state level workers, and also includes higher-level workforces.
Reasons cited for the interest of the Labguard(TM) product have been the
enhanced ease of use of the product and immediate on-site confirmation
as well as increased reliability of the results.
(CHECK FAVORITE NEWS SITE FOR MORE)

-- ADD THIS GEM TO YOUR RADAR AND WATCH TRADE ON MONDAY!
-- DON'T EVEN BLINK!
-- SWNM DOESN'T SLEEP!

Removal: _____
Disclaimer: _____

FIG. 2

*ATTENTION ALL DAY TRADERS AND INVESTORS*

INVESOTR ALERT!
IT LOOKS LIKE ANOTHER RUN FOR SWNM!
WATCH SWNM LIKE A HAWK ON Monday July 31, 2006

Company Name:    SOUTHWESTERN MEDICAL, INC.
Stock Symbol:      SWNM
Friday Close:        0.09
Market Cap:         $33,000,000.00 (Approx)

SWNM.PK RELEASES BREAKING NEWS !
Southwestern Medical Solutions, Inc. (PINKSHEETS: SWNM),
is pleased to announce that it has entered into the formal stages
of negotiations regarding Pacific Rim nations distribution for its
proprietary Labguard(TM) product line.

During the last 3 months, Southwestern Medical has held discussions,
gathered data, and explored the prospective licensing of its Labguard(TM)
diagnostic system, to be sold through internationally based distribution
companies into Pacific Rim areas. The initial interest has been for the sale
of the product for government employee testing programs such as police
forces, local and state level workers, and also includes higher-level workforces.
Reasons cited for the interest of the Labguard(TM) product have been the
enhanced ease of use of the product and immediate on-site confirmation
as well as increased reliability of the results.
(CHECK FAVORITE NEWS SITE FOR MORE)

-- ADD THIS GEM TO YOUR RADAR AND WATCH TRADE ON MONDAY!
-- DON'T EVEN BLINK!
-- SWNM DOESN'T SLEEP!

Removal: rmvrmv_me@yahoo.com
Disclaimer: http://www.ehshwibz.info

FIG. 3

**ATTENTION ALL DAY TRADERS AND INVESTORS**

INVESTOR ALERT!
IT LOOKS LIKE ANOTHER RUN FOR SWNM!
WATCH SWNM LIKE A HAWK ON Monday July 31, 2006

Company Name:    SOUTHWESTERN MEDICAL, INC.
Stock Symbol:    SWNM
Friday Close:    0.09
Market Cap:      $33,000,000.00 (Approx)

SWNM.OB RELEASES BREAKING NEWS !
Southwestern Medical Solutions, Inc. (OTCBB: SWNM),
is pleased to announce that it has entered into the formal stages
of negotiations regarding Puerto Rico nationwide distribution for its
proprietary DeBugger(TM) product line.

During the last 3 months, Southwestern Medical has held discussions,
gathered data, and explored the prospective licensing of its DeBugger(TM)
Diagnostic system, to be sold through internationally based distribution
companies into Puerto Rico areas. The initial interest has been for the sale
of the product for government employee testing programs such as police
forces, local and state level workers, and also includes higher-level workforces.
Reasons cited for the interest of the DeBugger(TM) product have been the
automated ease of use of the product and immediate on-site confirmation
as well as increased reliability of the results.
[CHECK FAVORITE NEWS SITE FOR MORE]

-- ADD THIS GEM TO YOUR RADAR AND WATCH TRADE ON MONDAY!
-- DON'T EVEN BLINK!
-- SWNM DOESN'T SLEEP!

Removal:     remove_me@yahoo.com
Disclaimer:  http://www.abcdefg.info

Long line of spam-text word

Long line of spam-text ooooooooooooooooooooooooooooooooooooooooooooooooooooooooo Long line of spam-text Long line of spam-text

FIG. 28

Long line of spam-text word

Long line of spam text ooooooooooooooooooooooooooooooooooooooooooooooooo

Long line of spam text

Long line of spam text comments:
delete too small and too large objects

FIG. 34

Long line of spam-text word

Long line of spam text ooooooooooooooooooooooooooooooooooooooooooooooooooooo

Long line of spam text

Long line of spam text

--- comments:
lines building: select "current symbol" (first symbol by chronological order)

FIG. 35

Long line of spam-text word

Long line of spam text

Long line of spam text

Long line of spam text comments:
lines building:begin right threading

FIG. 36

Long line of spam-text word

Long line of spam text

Long line of spam text

Long line of spam text comments:
lines building: find next "current symbol"

FIG. 37

Long line of spam text woul

Long line of spam text oOoooooOoooOoooOOoOOoooOoooOoOoOOoOoOooOOoooOooOOooOooOoOOoo Long line of spam text Long line of spam text comments:
lines building: right threading    find next "current symbol"

FIG. 38(A)

Long line of spam-text word

Long line of spam text ooOooOoooOoooOooOoooOoOoooOoOooOoOooOoOooOooOo

Long line of spam text

Long line of spam text comments:
lines building: left threading   find next "current symbol"

left subline is empty

FIG. 38(B)

Long line of spam-text word

Long line of spam text oOooOoooOoooOoooogoooOoooOoooOoooOoooOoooOooOoo

Long line of spam text

Long line of spam text comments:
concatenating of left and right threaded sublines - is new line

FIG. 39

Long line of spam-text word

Long line of spam text oOooooOooOooOoOoOoOooOoOoOoOoOoOoOoOoOoOoOoOoOoOoOoOoOoOoOoOoO Long line of spam text Long line of spam text comments:
lines building: select "current symbol" (next "free" symbol by chronological order)

FIG. 40

Long line of spam-text word

Long line of spam text ooooooooooooooooooooooooooooooooooooooooooooo

Long line of spam text

Long line of spam text comments:
lines building

FIG. 41

Long line of spam-text word

Long line of spam text oOoOoOoOoOoOoOoOoOoOoOoOoOoOoOoOoOoOoOoOoOoOoOoOoOoOoO

Long line of spam text

Long line of spam text comments:
lines building

FIG. 42

Long line of spam-text word

Long line of spam text ooooooooooooooooooooooooooooooooooooooooooooooooo

Long line of spam text

Long line of spam text comments:

lines building: select "current symbol" (next "free" symbol by chronological order)

FIG. 43

Long line of spam-text word

Long line of spam text

Long line of spam text

Long line of spam text comments:
lines building    left subline threading

FIG. 45

Long line of spam-text word

Long line of spam text

Long line of spam text

Long line of spam text comments:
lines building

FIG. 46

Long line of spam-text word

Long line of spam text

Long line of spam text

Long line of spam text comments:
lines building

FIG. 47

Long line of spam-text word

Long line of spam text

Long line of spam text

Long line of spam text comments:
lines building

FIG. 48

Long line of spam-text word

Long line of spam text

Long line of spam text

Long line of spam text

Long line of spam text comments:
lines building    ( left subline is empty)

FIG. 49

Long line of spam text mold

Long line of spam text

Long line of spam text

Long line of spam text comments:
remove too short and too long words

FIG. 52

Long line of spam text
Long line of spam text
comments:
   count of resulting lines of text is not too small
FIG. 54

SYSTEM AND METHOD FOR IDENTIFYING TEXT-BASED SPAM IN RASTERIZED IMAGES

BACKGROUND OF THE INVENTION

1. Field of the Invention

The present invention relates to identification of text in graphical images, particularly images that are suspected of being SPAM, and particularly SPAM-images with text that has been deliberately altered to defeat OCR and binary signature methods of SPAM detection.

2. Description of the Related Art

SPAM emails have become a veritable scourge of modern email systems. It is estimated that as much as 60-80% of Internet email traffic today is of a SPAM nature. SPAM, in addition to being annoying and wasteful of the time of the recipient, places a considerable burden on large email service providers and on corporate networks. For a regular user, the cost of SPAM that gets through is a few clicks that it takes to delete the offending message. For large-scale email providers, such as Google, Yahoo, Microsoft, as well as for large corporations that have their own server-based solutions for SPAM filtering, handling SPAM is a problem that needs to be solved on an industrial scale. For example, such large mail service providers need to filter millions of SPAM messages every hour.

A phenomenon observed recently is the increasing professionalization of SPAM generators. Many of the techniques used by SPAM generators closely mirror and borrow from the techniques used by many professional virus writers. At any given moment millions of computers connected to the Internet are zombified. In other words, these computers spew out vast numbers of SPAM emails, even though the owners of these computers are unaware of this fact.

Although in the early days of the SPAM epidemic it was possible to filter SPAM by looking for keywords, such as "Viagra," "Hoodia," "free offer" and so on, modern SPAM has evolved far beyond such simple and easily filterable examples. Today it is common to find SPAM embedded in images, which are themselves embedded within the body of the email or sometimes as an attachment to an otherwise innocuous email. The problem of filtering image-based SPAM presents a difficulty to the anti-SPAM software vendor, because filtering images generally requires a dramatically greater investment in hardware resources, compared to filtering simple text-based SPAM. Also, for large email service providers and corporate email servers, such SPAM filtering needs to deal with the SPAM more or less on-the-fly or within at most a few seconds, and it would be unacceptable if the SPAM filters delayed receipt of the email by significant time.

Image-based SPAM has thus far defied an effective solution primarily for two reasons. One is that SPAM generators have quickly learned to defeat signature-based methods of SPAM detection. If a known SPAM message (for example, a known SPAM GIF or a JPEG) is bitwise-compared to a suspect image, then by randomly changing a handful of bits in the images, the image remains virtually unchanged to the human observer but has a different signature (if only by a handful of bits). For example, where three bytes are used to represent each color pixel, changing only one bit of one pixel of a large image would be undetectable to the naked eye, but nonetheless such an image would be treated as having a different signature by the signature method of SPAM detection. Any changes in the background of the image, the color of the background or the letters, distributing random "blotches" or "spots" in the background of the image and so on, all combine to defeat the signature-based method for detecting SPAM in images.

Another way to detect image-based SPAM is through optical character recognition (OCR). The OCR-based methods have two primary drawbacks: first, they are very resource intensive and are difficult for use in email systems that process large numbers of such emails per unit length of time. The second problem is that the accuracy of OCR systems is significantly less than 100%, raising the prospect of a false positive detection of a message which in fact is actually not SPAM.

In the industry, a false positive is generally regarded as a greater evil than letting through some number of SPAM messages, since very often an email falsely identified as SPAM by the SPAM filter will never be seen by its recipient, or, at best, it would be seen much later by the recipient. Additionally, just as spammers have learned to defeat the signature method of SPAM detection, some techniques that attempt to defeat OCR-based SPAM detection techniques have become available. They include writing text not in a straight line, but using wavy or curved lines, addition of noise to the image, spacing the letters in the words such so the words could not be recognized by OCR software, writing some letters at an angle, etc.

An example of a multi-stage method for analysis of raster images is described in Russian Patent No. 2234734. In this patent the first stage is a preliminary text identification using a less exact method, and then using a more exact object identification for those objects that are left unidentified in the image. In the first stage the image is segmented into regions, tables, text fragments, text lines, words and symbols, and in the second stage the segmentation is further defined, using additional available information.

A similar principle is described in Russian Patent No. 2251151, where different objects in the image are divided into levels, based on the degree of complexity, such as a symbol, word, text line, paragraph, table, region. Each object is then associated with a particular level and the connections between objects of different levels and of the same level are then identified. Then a hypothesis is formulated regarding the properties of the various objects, which is later corrected, based on various image attributes.

Both of these methods essentially lack an identification of text elements in the image, which makes the processing of such images in real time a relatively difficult task.

U.S. Patent Publication No. 2004/0221062 describes a method where in order to identify contents of the image, a preliminary visualization of the image is done in a first format, and afterwards the message is transformed into a purely symbolic format, so that to filter out decorative components of an image, prior to text analysis. U.S. Pat. No. 7,171,046 also describes certain aspects of text identification in images.

U.S. Patent Publication No. 2005/0281455 describes a method of processing images and text in the images using a neural network. U.S. Pat. No. 6,470,094 describes a general localization methodology for text in images, where, as a symbol, several adjacent pixels are used, which, in turn, are combined into words.

U.S. Pat. No. 6,608,930 also describes identification of text in video images. In this patent, a first color is separated out, to enhance the contrast, which is further enhanced using a 3×3 map. Random noise is then removed using median filtration. The edge of the image is identified using an adaptive threshold, and then edges are removed from the image, so that portions of the image are deleted where there is no text, or where text cannot be reliably identified. Pixels that are close to each other are then combined into a single symbol, and then adjacent symbols are combined into words and then text lines. However, the method described in this patent is relatively calculation-intensive, and has not found substantial popularity.

Accordingly, there is a need in the art for an effective method of identifying text in images and an effective message of SPAM detection in emails that include embedded or attached images.

SUMMARY OF THE INVENTION

Accordingly, the present invention is directed to a method and system for detection of text and SPAM in images that substantially obviates one or more of the disadvantages of the related art.

In one aspect of the invention, there is provided a system, method and computer program product for identifying spam in an image, including (a) identifying a plurality of contours in the image, the contours corresponding to probable symbols (letters, numbers, punctuation signs, etc.); (b) ignoring contours that are too small or too large given the specified limits; (c) identifying text lines in the image, based on the remaining contours; (d) parsing the text lines into words; (e) ignoring words that are too short or too long, from the identified text lines; (f) ignoring text lines that are too short; (g) verifying that the image contains text by comparing a number of pixels of a symbol color within remaining contours to a total number of pixels of the symbol color in the image; and (h) if the image contains a text, rendering a spam/no spam verdict based on a contour representation of the text that remains after step (f).

The image can be converted from a vector form to a raster form prior to step (a). The image can be converted from a multi-color form to a two-color form, prior to step (a). One of the two colors can be identified as a background color, and the other color as the symbol color. A spectral distribution of the two-color image can be generated, and a threshold set between the two colors at a level $X2+\frac{3}{4}(X1-X2)$, $X1$ being a center of mass of the spectral distribution, and $X2$ being a first color used in the spectral distribution. Identification of each contour includes identifying a first pixel of the symbol color, defining the contour as the first pixel, and then repeatedly expanding the contour in those directions where adjacent pixels are also of the symbol color. As an alternative, the contour can be filled with a background color, or those pixels that have been processed can be excluded from further processing. In step (d), for each contour, identifying contours that are within $2Xim$ of the contour as belonging to a suspected word, wherein $Xim$ is a most frequent distance between all the adjacent contour pairs in all text lines Additional features and advantages of the invention will be set forth in the description that follows, and in part will be apparent from the description or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 2 illustrates an exemplary image of SPAM, such as commonly found imbedded in SPAM emails.

FIG. 3 illustrates the image of FIG. 2, converted to a black/white form.

FIG. 4 illustrates the contours drawn around probable symbols in the image of FIG. 3.

FIG. 6 illustrates the contours shown in FIG. 4, with the contours that are too small or too large (and other noise) to be removed.

FIGS. 21-55 graphically illustrate the process described earlier, with additional detail shown, and with a commentary added to the figures to illustrate each step.

Figure 56:
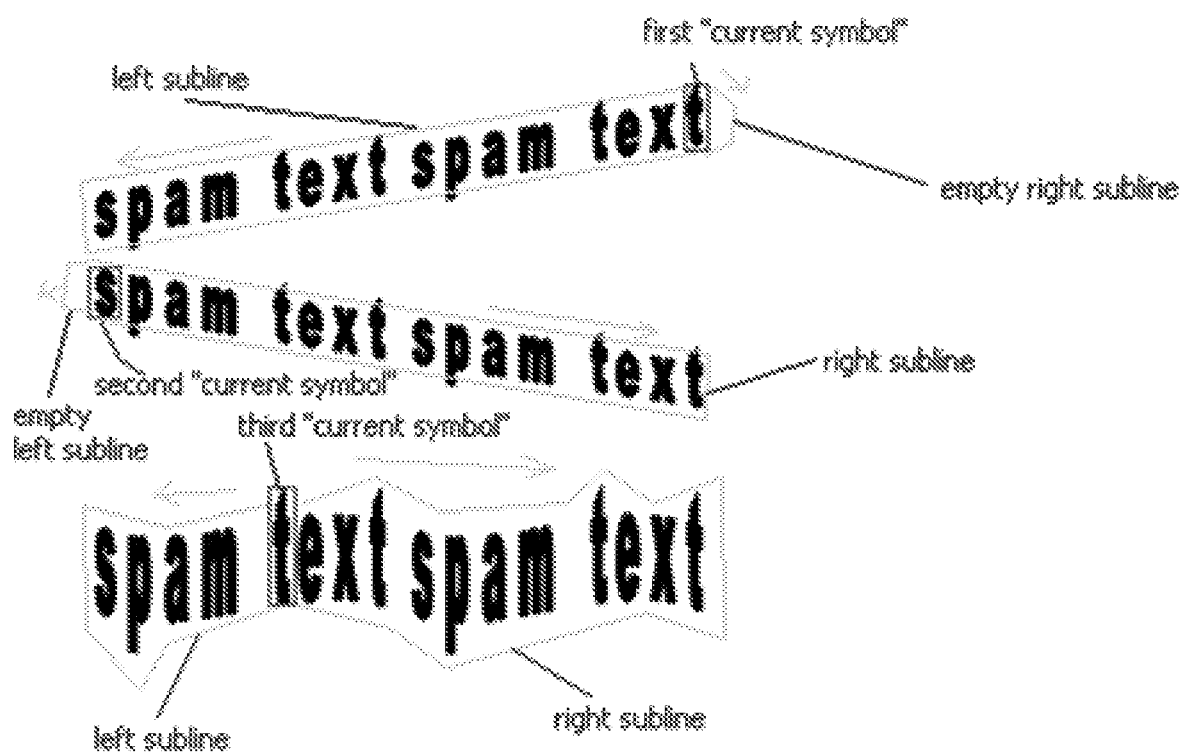

FIG. 56 is an additional illustration of left-threading and right-threading.

DETAILED DESCRIPTION OF THE PREFERRED EMBODIMENTS

Reference will now be made in detail to the preferred embodiments of the present invention, examples of which are illustrated in the accompanying drawings.

Figure 1:
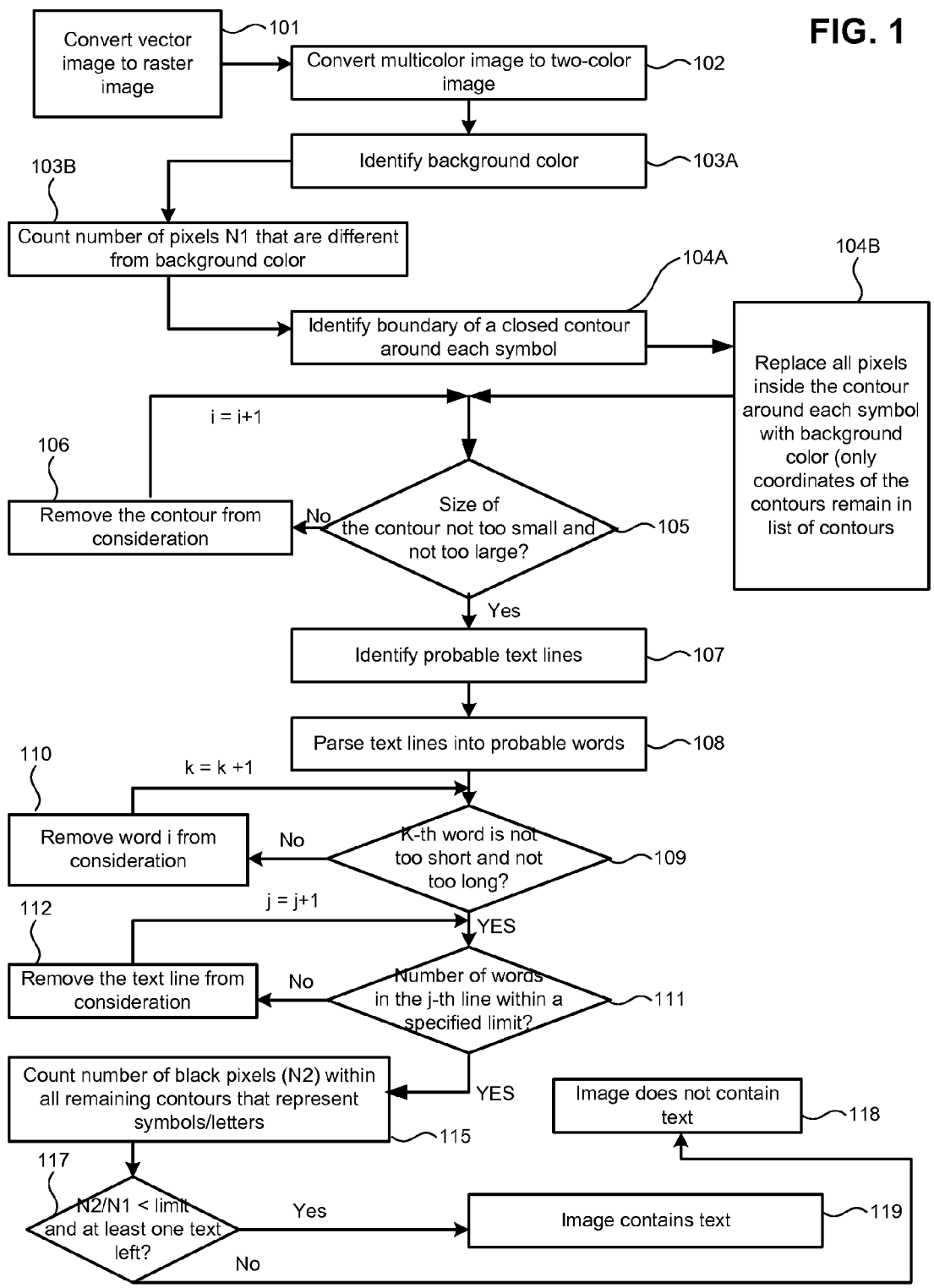
FIG. 1 illustrates a basic algorithm of identifying text in images, according to one embodiment of the invention.

FIG. 1 illustrates an exemplary embodiment of the method for identifying text in an image according to one embodiment of the invention. As shown in FIG. 1, in step 101, the image is first converted, if necessary, from a vector form into a raster form (in other words, essentially, to a bitmap-type image). In step 102, if the image is a color image (see FIG. 2), it is converted to a two-color image (see FIG. 3). Although for purposes of the analysis it doesn't matter what the two colors are (they can be black and white, they can be red and green, and so on—as long as they are different), in the remainder of this discussion black and white will be used as examples. An example of such an image is illustrated in FIG. 2, prior to conversion to a two-color image, and the image in FIG. 3 is the black/white image after the conversion. Note that in a black/white printout, the image in FIG. 2 appears somewhat blurry, while a printout of the black/white version of FIG. 3 appears sharper. However, this is an artifact of the perception of the human eye—the original color image of FIG. 2 and the black/white image in FIG. 3 are similar in terms of "sharpness," to the human eye.

In step 103A, the background color is identified. In this discussion, white color will be used as the background color, and black will be used as "the other color", although it will be appreciated that this is entirely arbitrary. In step 103B, the algorithm counts the number of pixels in one that are different from the background color. Presumably, these pixels are associated with the text, although at this point this is only a presumption, and it is expected that at least some of these pixels represent noise or random data (possibly deliberately added to the image by the spammer).

Steps 104A and 104B should be viewed together. In step 104A, the boundaries of the contour around each symbol are identified. In step 104B, all the pixels inside the contour are filled with the background color (in this example, filled with white, see also FIG. 5). The contour is a boundary within which a symbol is presumably found and which fully encloses the symbol. The symbols can be letters, numbers, punctuation signs, etc. The contour, in the preferred embodiment, is a minimal rectangle that completely encloses the symbol, although other shapes of the contour are also possible. Algorithmically, the rectangle can be specified by its four corners or by its two opposite corners (in the Cartesian coordinates or in any number of ways) the important point is that the contour completely encloses the symbol, or what is at this point is a suspected symbol.

Figure 5:
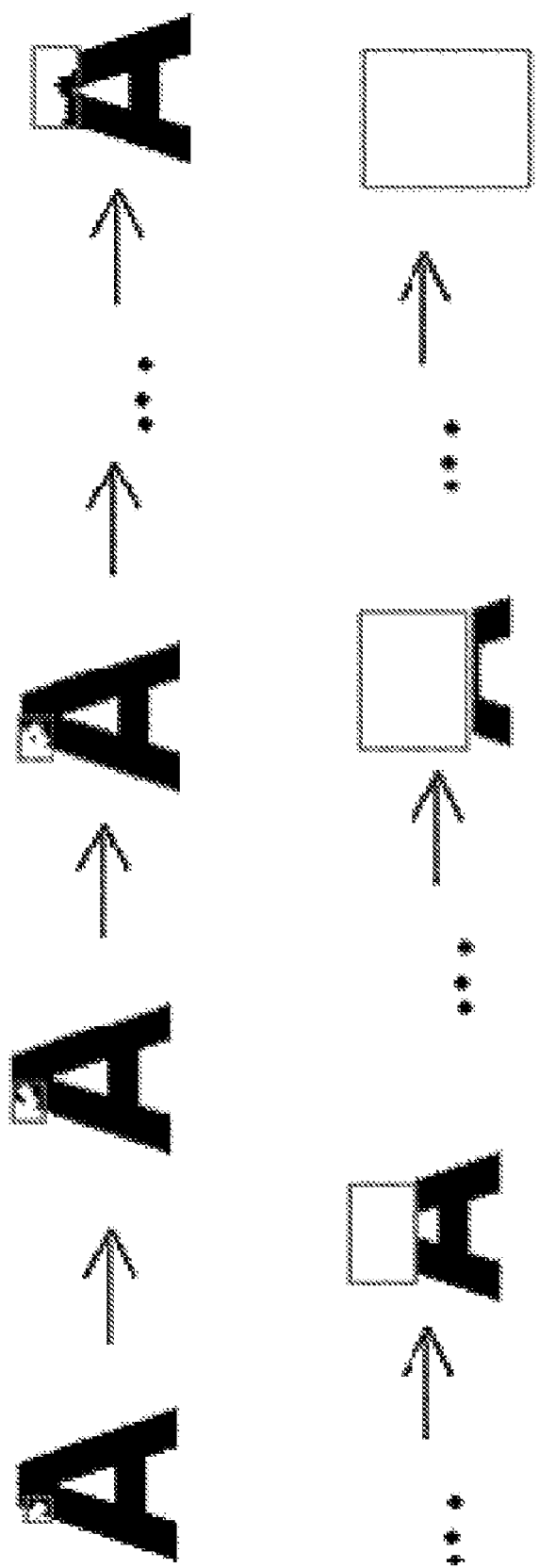
FIG. 5 illustrates the process of generating a contour around a probable symbol.

The process of generating the contour and filling the contour with the background color is illustrated in FIG. 5, using letter A as an example. Upon encountering a pixel that presumably belongs to a symbol, in other words, a black pixel, the algorithm starts with a "rectangle" that begins with just a dot. Then the adjacent pixels are checked. If the adjacent pixel to the left of the current pixel is also black, then the boundary of the contour expands to the left. If the pixel to the right of the current pixel is black, then the contour boundary shifts to the right. The same process is repeated for all 8 adjacent pixels, and the algorithm proceeds as illustrated in FIG. 5, expanding the contour, and also filling the contour with the background color.

In steps 104A-104B, the size of the contour can be iteratively increased in the relevant direction by a predetermined amount, for example, by one pixel, by a certain number of pixels, or by some relative amount, for example, by ⅓, or ¼, of the current size of the contour in that dimension. The algorithm is generally recursive and carries out the following:

(1) A first black pixel is picked out and assigned as a "current" pixel (note that there is no requirement that the point be at the edge of the symbol, although in practice, this is often the case). The contour, at this point, encloses the first black pixel (or is equal to only one pixel);

(2) Next, the current pixel is filled with the background color;

(3) If the current pixel is outside the contour, the contour is expanded to reach the current point (only those boundaries of the contour which are necessary to expand are actually expanded);

(4) for all adjacent black pixels, step 2 is repeated.

Upon completion of steps 104A and 104B, the image can be represented by what is shown in FIG. 4, which contains a number of contours that presumably represent (enclose) all letters/symbols.

The next task is to filter out those contours that are either or too large. Empirically, it has been observed that SPAM very rarely contains relatively large letters. Relatively small contours (e.g., only a few pixels by a few pixels, such as 2×2 pixels, or 3×3 pixels) are most likely due to noise, rather than an actual letter or symbols. Therefore, in steps 105 and 106, for each contour its size is checked, and those contours that are either too small in size, or too large in size, are "thrown out." For example, with reference to FIG. 5, the contour around the first asterisk at the top left corner would remain unchanged, but contours that are too small (a contour around a small dot) would be removed from consideration (FIG. 6).

Figure 8:
FIG. 8 illustrates how the contours remaining after FIG. 6 are parsed into words.
Figure 9:
FIG. 9 illustrates how the text lines are parsed into words.

The next task for the algorithm is to identify the probable text lines (step 107), and then to parse the identified text lines into probable words (step 108) (see resulting FIG. 8). Once the probable words and lines are identified, the next task is to remove words that are too short or too long from consideration. This is accomplished in steps 109 and 110 (see resulting FIG. 8). Then, for steps 111 and 112, the text lines that are too short (e.g., having fewer than 2 or 3 words, as an example) are also removed from consideration (see resulting FIG. 9). At this point, the only contours that remain are those that presumably do not include any noise, do not include any randomly positioned letters or very short words, and which bear a high probability of containing text—if indeed the image does contain text.

Next, the algorithm needs to ensure that the likelihood of a false positive is low. To avoid the false positive, the number of pixels that are black are counted only within the contours that remain after steps 111 and 112 (to do this, the image in the form shown in FIG. 3 needs to be used, rather than the image with the contours filled in with white background color). The number of black pixels within the remaining contours (N2) is compared with the total number of black pixels (N1) in the black/white image in FIG. 3. If the ratio of the two numbers N2/N1 is less than a predetermined number (e.g., 40%, 50%, 60%, etc.), and there is at least one text line after filtration, then, in step 119, the algorithm concludes that the image contains text and should be analyzed for SPAM. Otherwise, in step 118, the algorithm concludes that the image does not contain text (or does not contain enough text to warrant further SPAM analysis).

Figure 10:
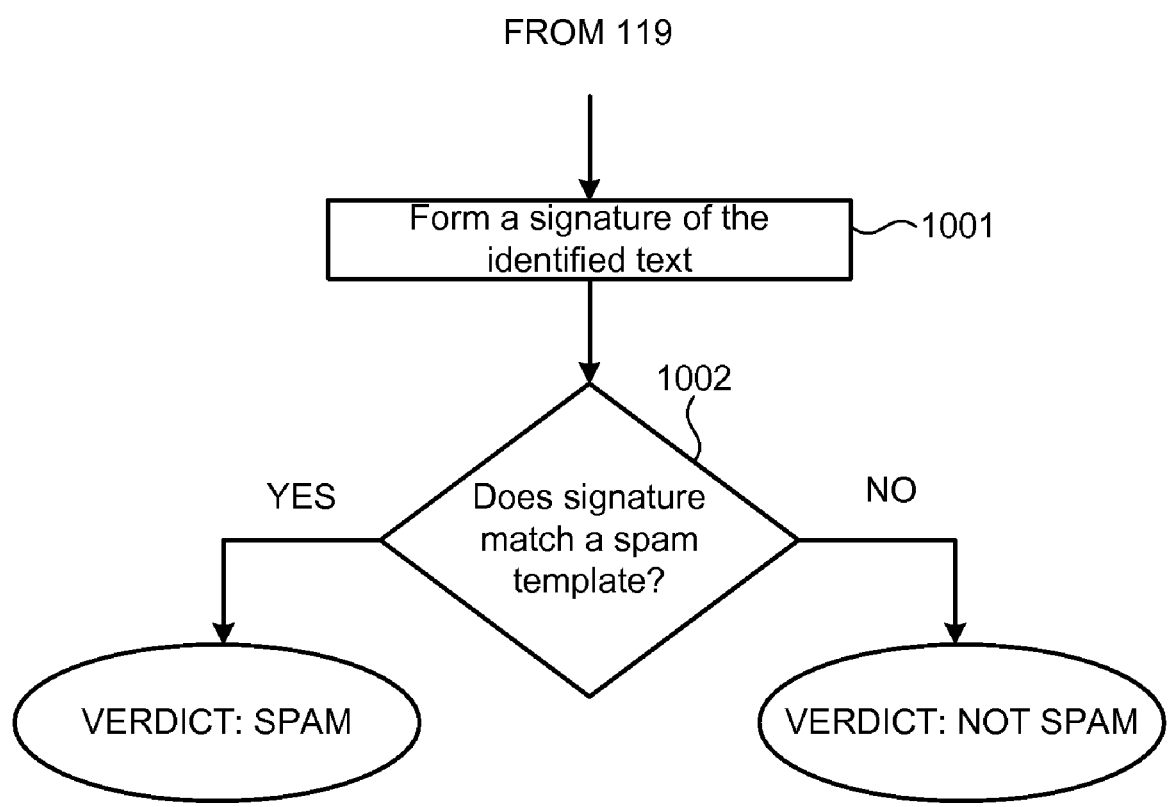
FIG. 10 illustrates how a SPAM/not SPAM verdict is reached, following the algorithm of FIG. 1.

After step 119, the presumed text can be compared against a database of text signatures, see FIG. 10. Note that it is not actually the words or letters that are compared, but rather the signatures of the image in their contoured form. In other words, if such signatures were to be represented as images, they would roughly resemble the image in FIG. 9. In step 1001, a signature is formed for the text that was previously identified. Note that what is used as a signature is not words proper but the lengths of the words and the relative arrangement of the symbols (regardless of what the symbols are) in the text lines. In step 1002, the signature is checked against a SPAM template. Note that for each particular SPAM image, there could be multiple variations, particularly where the spammers attempt to subvert the analysis by adding noise, moving the words and letters relative to each other slightly and using other tricks. Therefore, different SPAM messages could actually have the same signature or template. After step 1002, the algorithm can then render a verdict as to whether the image likely is a SPAM image, or does not contain SPAM.

Figure 11:
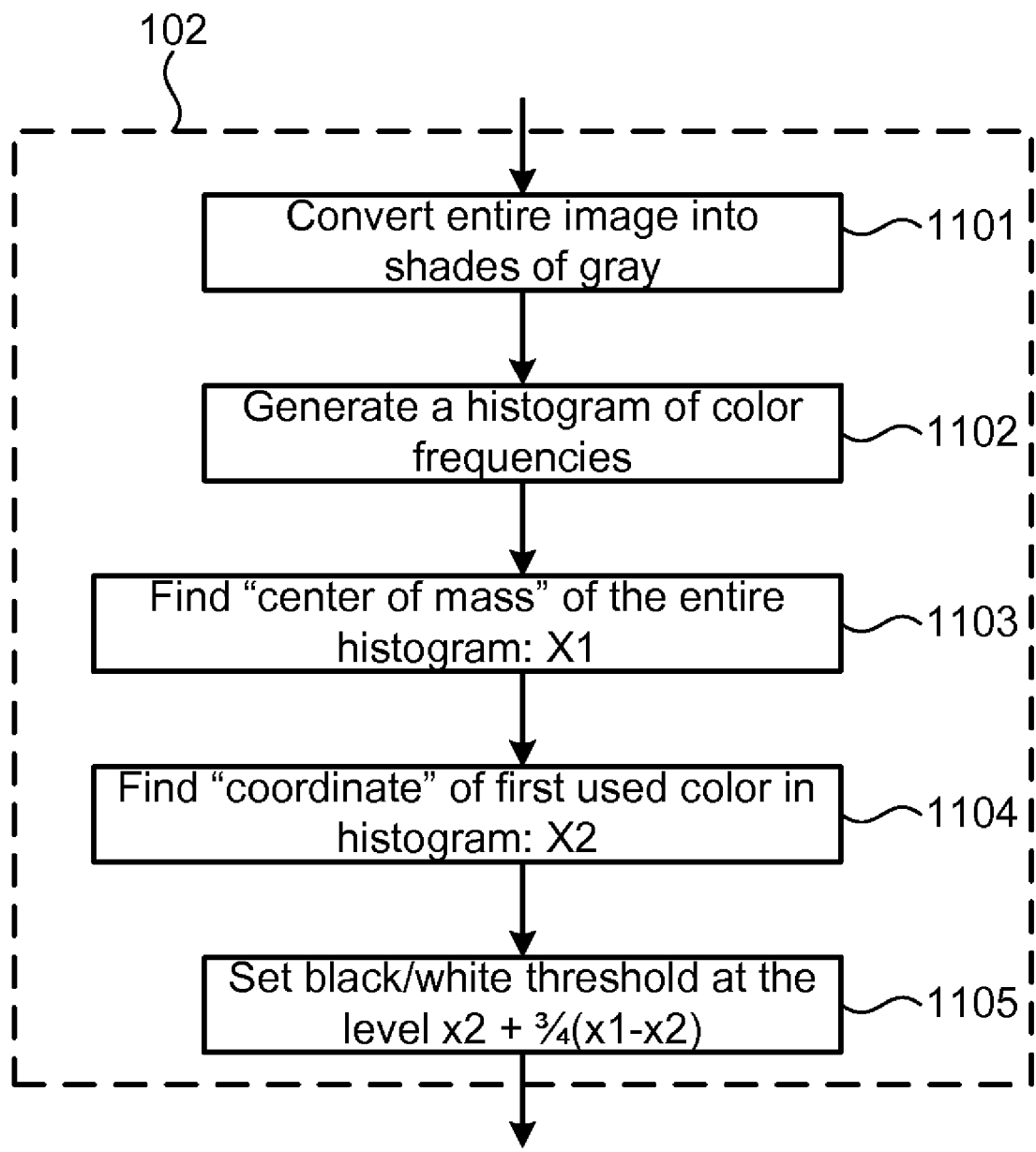
FIG. 11 illustrates the algorithm used for converting a color image into a black and white image
Figure 12:
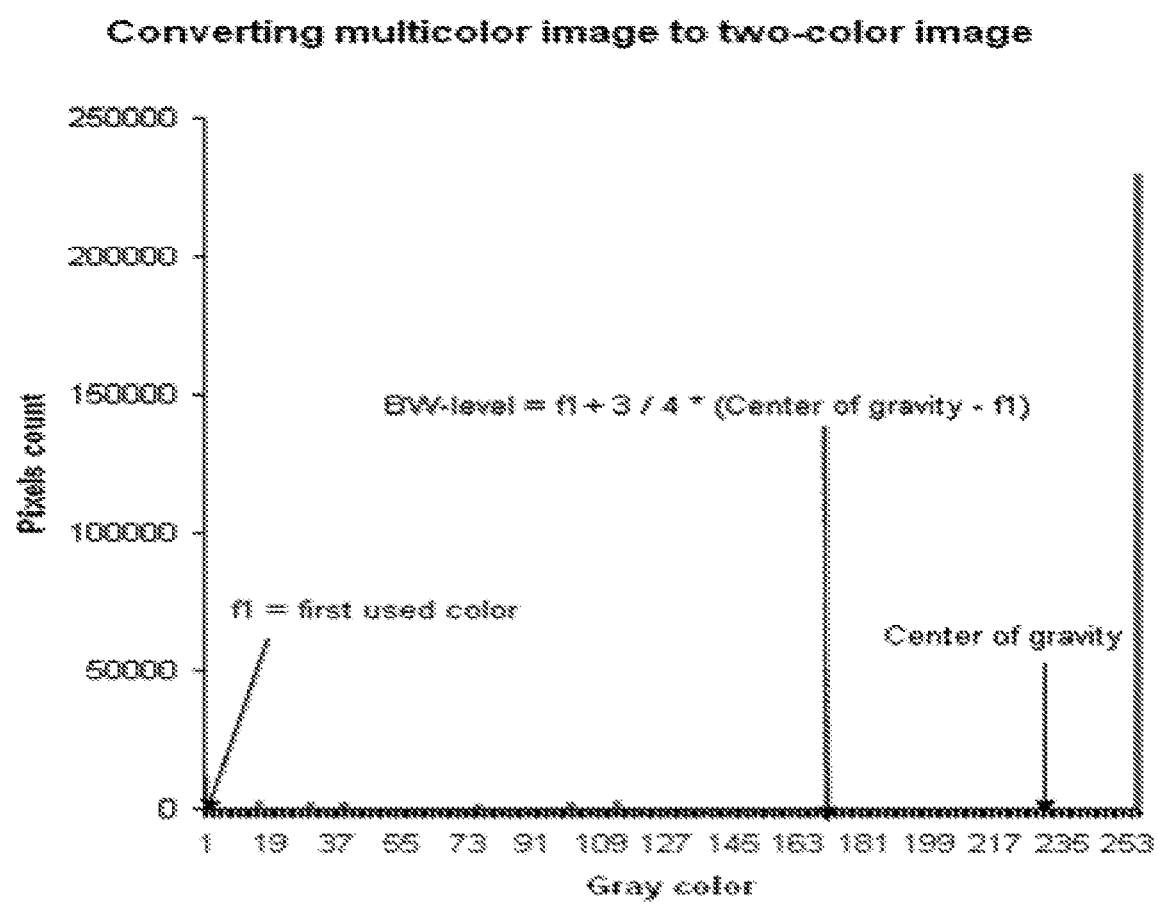
FIG. 12 illustrates an example of a histogram representation for conversion of a multi-color image into a two-color image.

FIG. 11 illustrates the process of converting a multicolor image through a two-color image, see step 102 in FIG. 1. In step 1101, the image is converted into shades of gray. In step 1102, a histogram of color frequencies (i.e., shades of gray frequencies) is generated. An example of such a histogram is shown in FIG. 12. In step 1103, a center of mass of the histogram is identified. In step 1104, the X-coordinate of the first gray color used in the histogram is identified. In step 1105, the black/white threshold is set at the level of ¾ between the center of mass and the first color used. As an alternative, for step 102, all the colors that are darker than some specified color, for example, RGB (127, 127, 127) can be treated as black, and all colors that are lighter can be treated as white.

Figure 13:
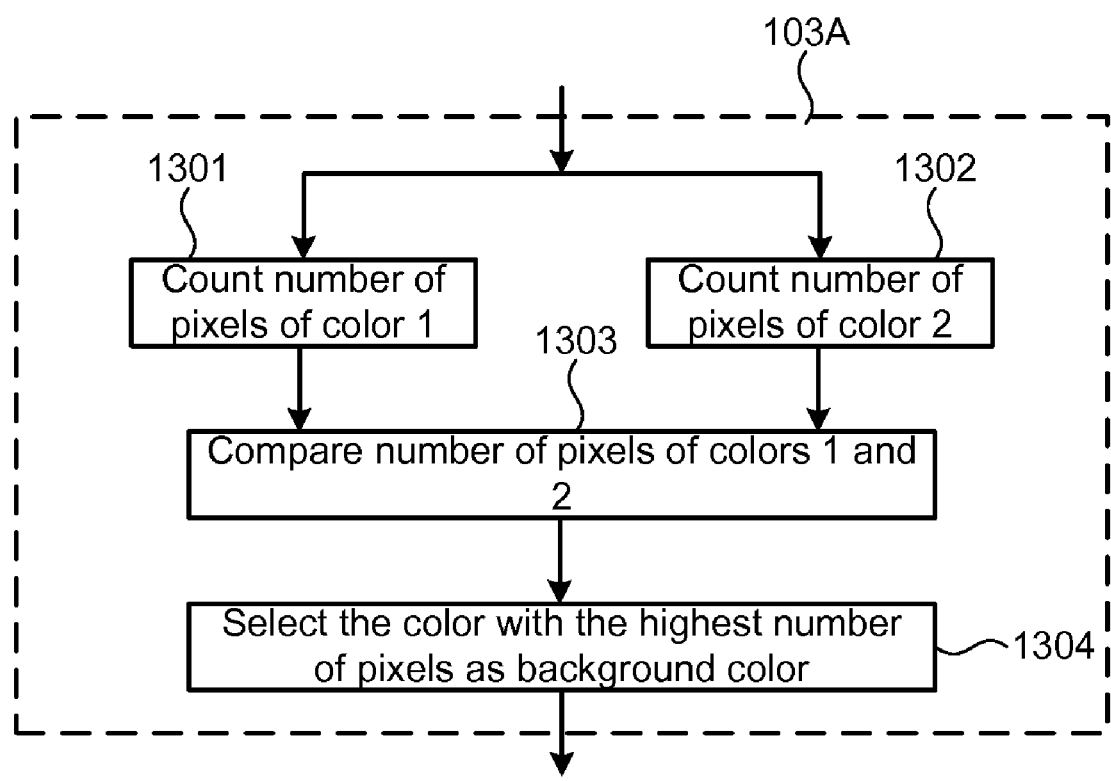
FIG. 13 illustrates a selection of one of the two colors as the background color.

FIG. 13 illustrates how the background color is identified, corresponding to step 103 in FIG. 1. As shown in FIG. 13, the number of pixels of the first color are counted, in step 1301. Also, in step 1302, the number of pixels of the second color are counted. In step 1303, the number of pixels of the two colors are compared. The color with the highest number of pixels is then chosen as the background color in step 1304. Other mechanisms can be utilized for identifying the background color. For example, the region of the image that is roughly in the center (or at least enclosing the center) can be regarded as having text and the border of the image can be tested for some color which is dominant. That color can then be used as the background color.

Figure 14:
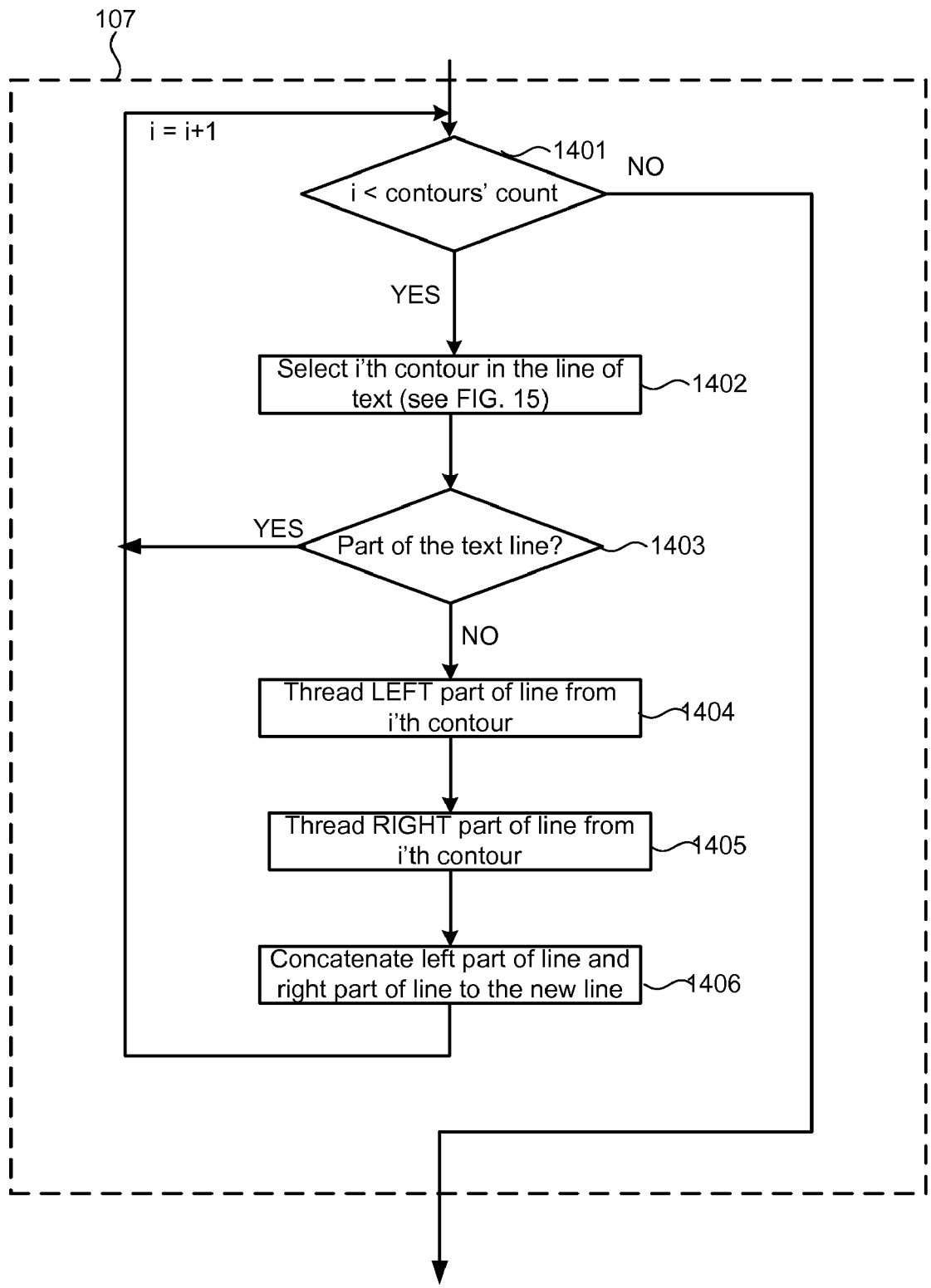
FIG. 14 illustrates the algorithm for identifying probable text lines.
Figure 15:
FIGS. 15-17 illustrate how contours are threaded to the left and right to identify a probable text line.
Figure 16:
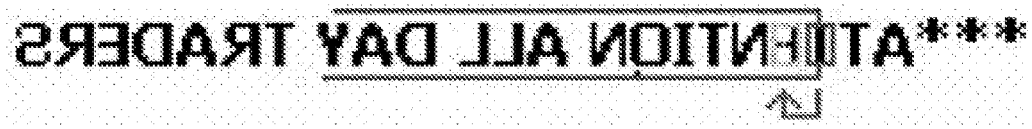

FIG. 14 illustrates how probable text lines are identified, see step 107 in FIG. 1. As shown in FIG. 14, in step 1401, the count of the contours is checked. If any contours are still remaining, the i-th contour in the line is checked. This is illustrated in FIG. 15, in this case for the first line of text in the message and for the sixth symbol, or contour in that line. In step 1403, the algorithm checks if the contour if it is already part of a text line. If it is, then, in step 1404, the algorithm threads to the left for the text line. This is illustrated in FIG. 16. Then, in step 1405, the algorithm threads to the right, see FIG. 15. Note that this needs to be done to ensure that things like different fonts, or attempts to write a word using a wavy line arrangement, will not affect the process. In step 1406, the left and the right parts of the line are concatenated. Note that if, in step 1403, it turns out that a particular contour is already part of an identified text line, that contour does not have to be further considered for this operation.

A more common situation is the one where there is no threading to the left and the symbols can be taken from left to right and from top to bottom. However, if some of text is rotated or written in a circle, then the first symbol must be the last symbol of the text line. The approach described herein works regardless of how the text is oriented, and without a prior knowledge of the arrangement of the text.

Figure 18:
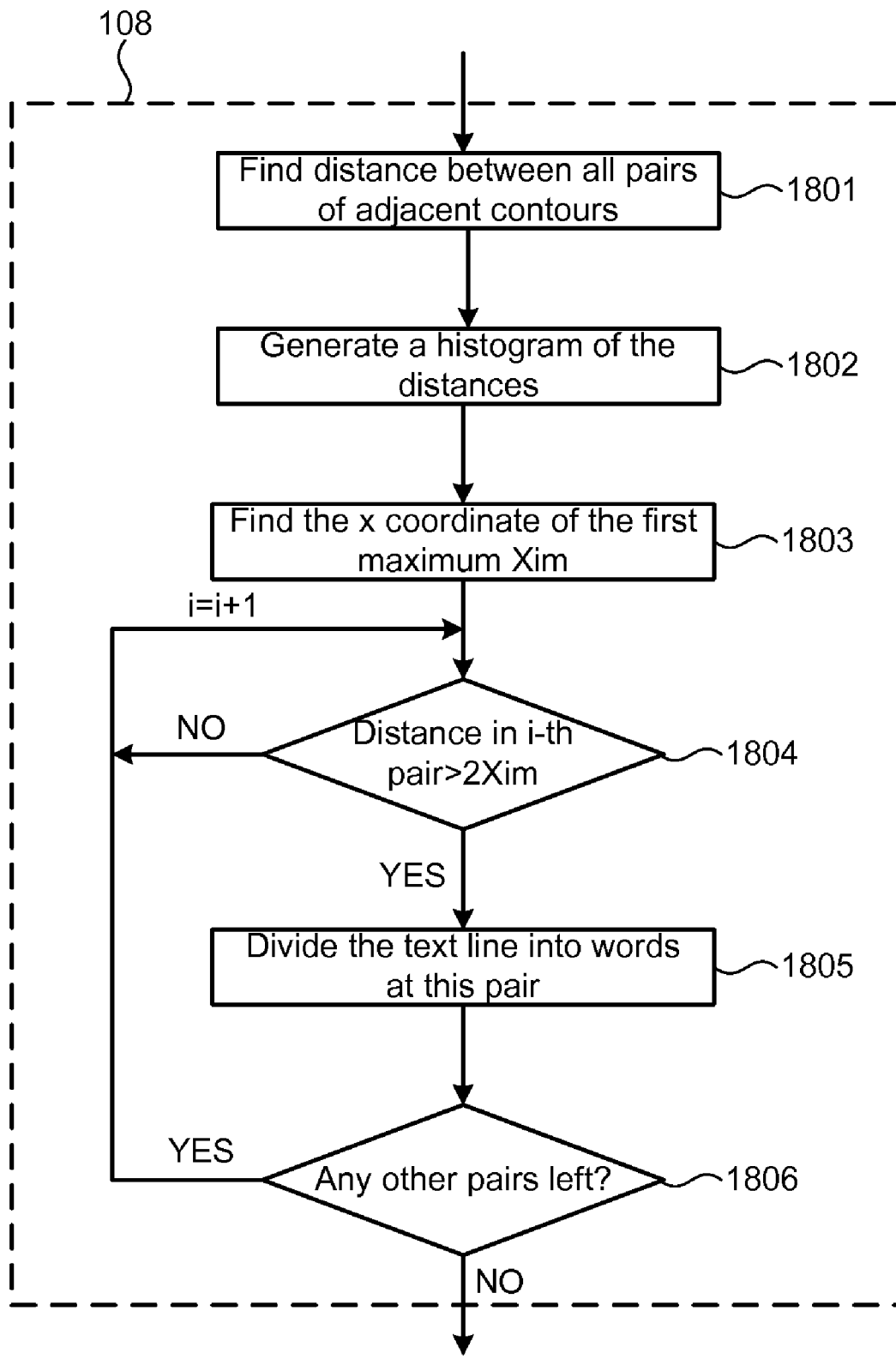
FIG. 18 illustrates the algorithm for parsing text lines into words.

FIG. 18 illustrates the process of parsing text lines into probable words, see step 108 in FIG. 1. As shown in FIG. 18, first, the distances between all the adjacent pairs of contours are found, in step 1801. In step 1802, a histogram can be generated for the distances. In step 1803, the ex-coordinate in the histogram of the first maximum is identified. In step 1804, for the i'th pair of contours, the distance is checked to see if it is greater than 2×Xim. If it is, then, in step 1805, the text line will be divided into individual words at that point. If it isn't, then the next pair or contours will be checked. In step 1806, if there are no other contours in the text line left to check, the algorithm proceeds to the next step (see 109 and 110 in FIG. 1). Otherwise, the remaining contours for any other lines will be checked using the same process.

Figure 17:
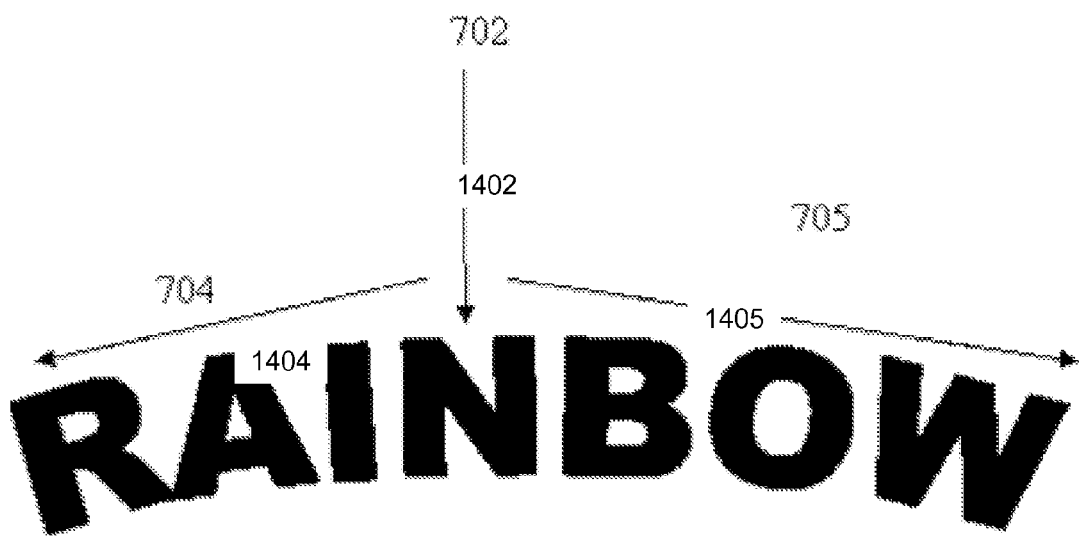
Figure 19:
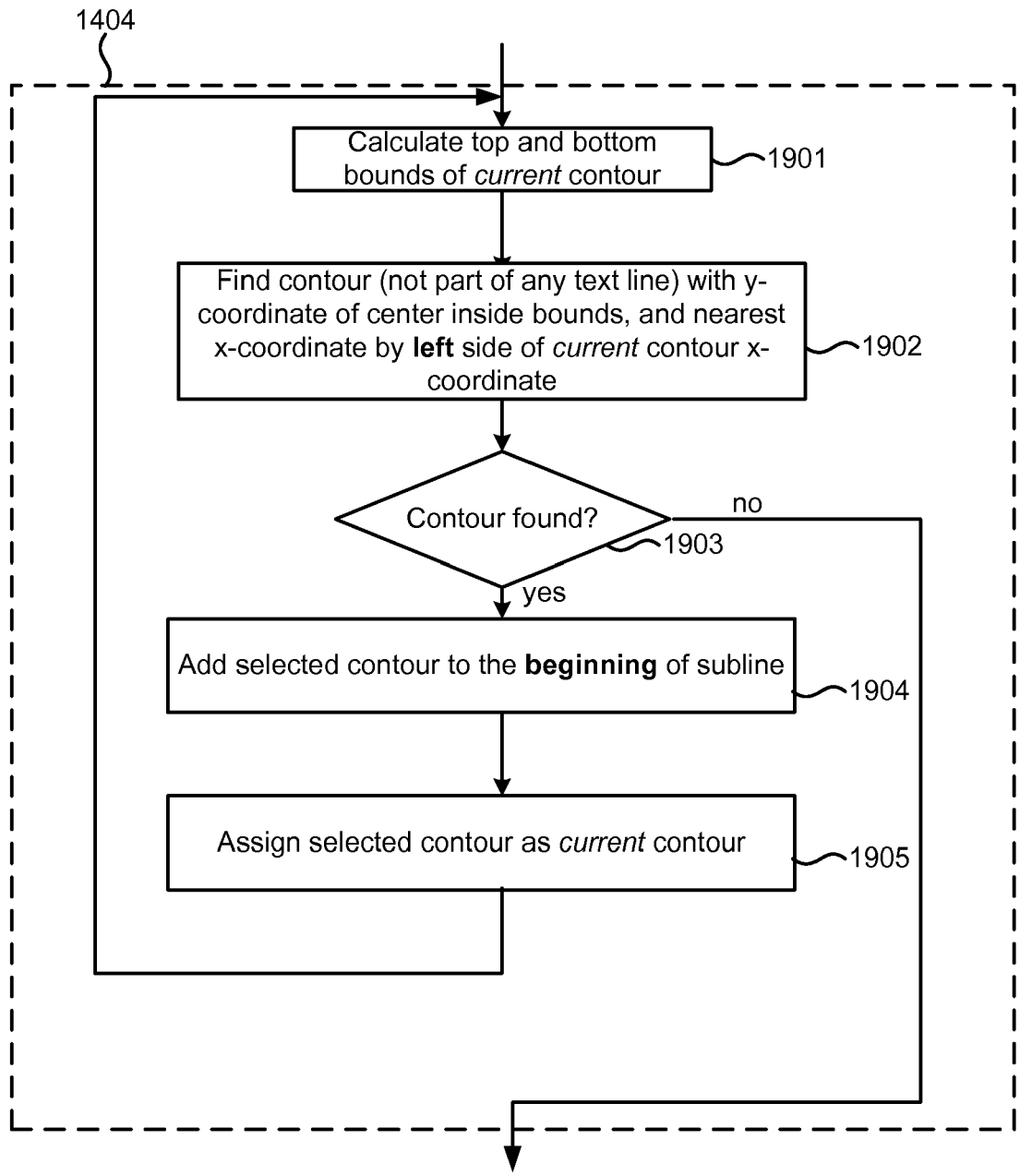
FIGS. 19 and 20 illustrate additional details of left and right threading of FIG. 14.
Figure 20:
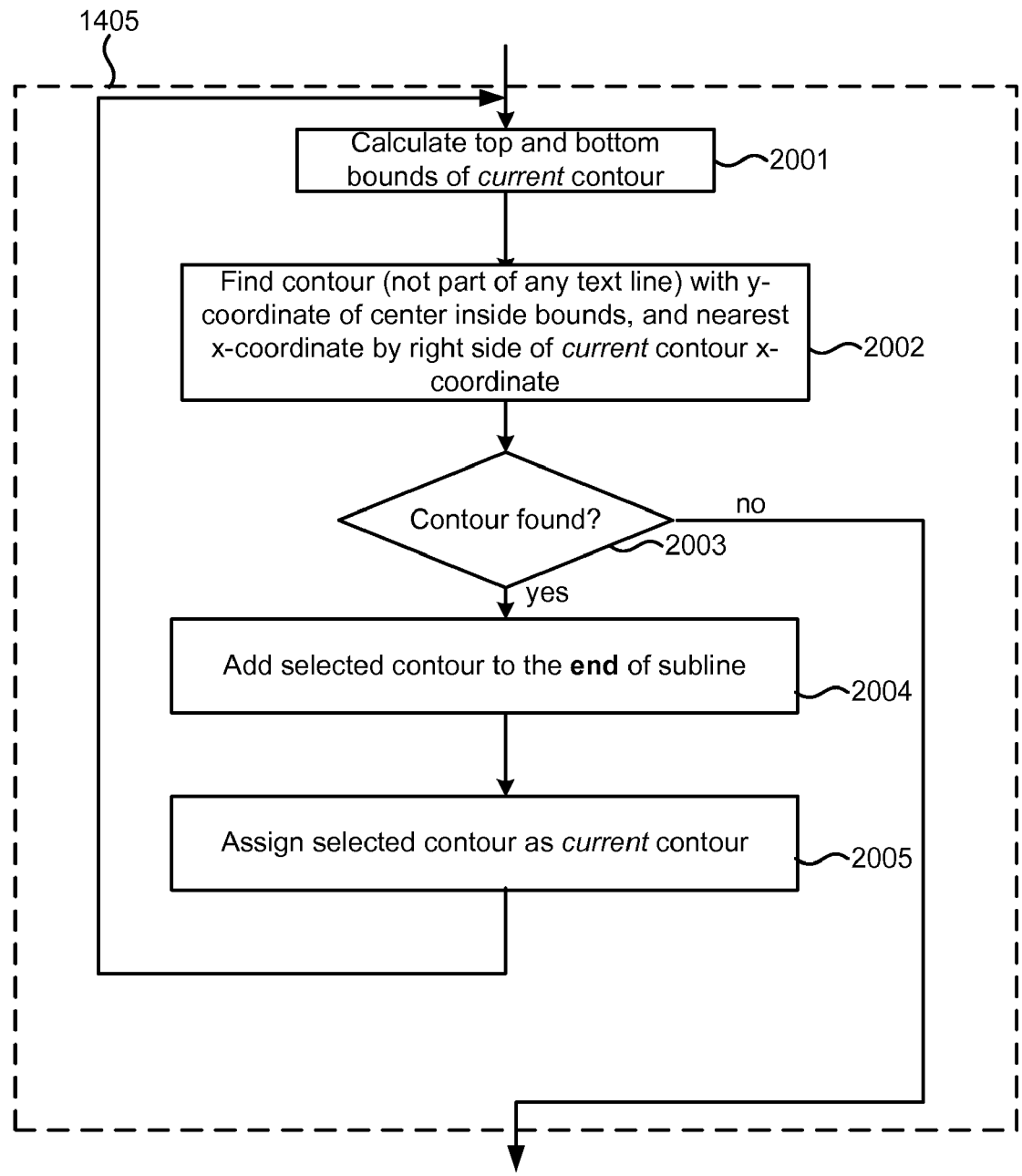
Figure 21:
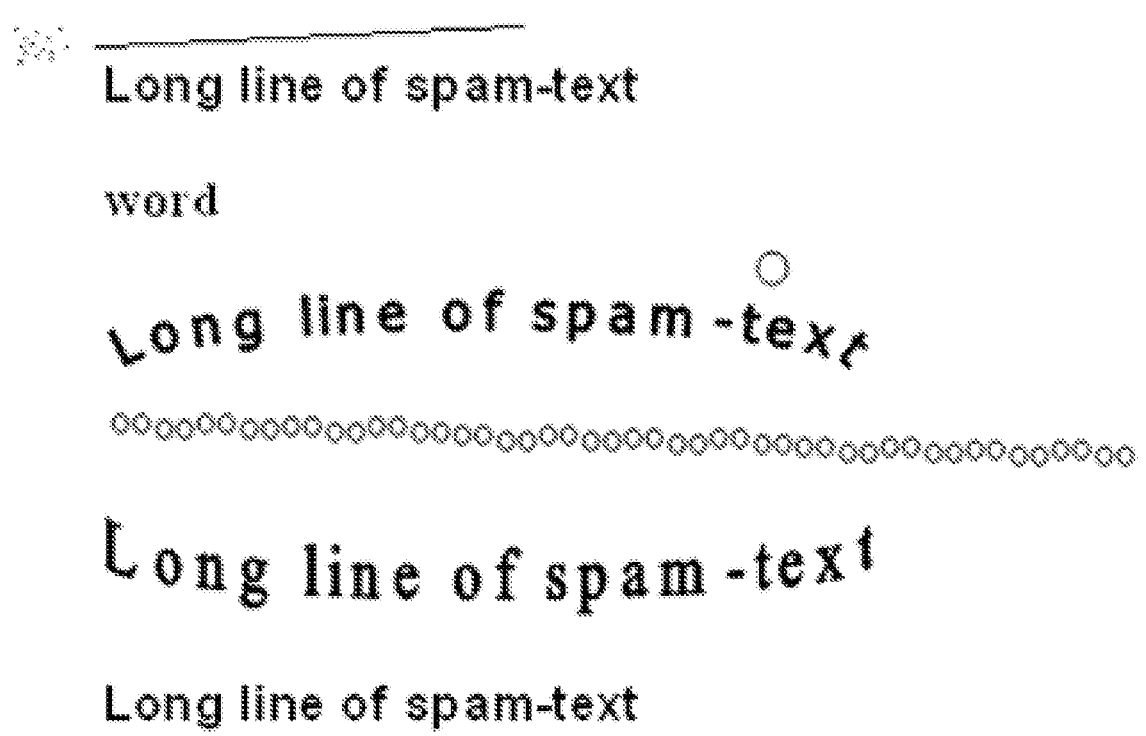
Figure 22:
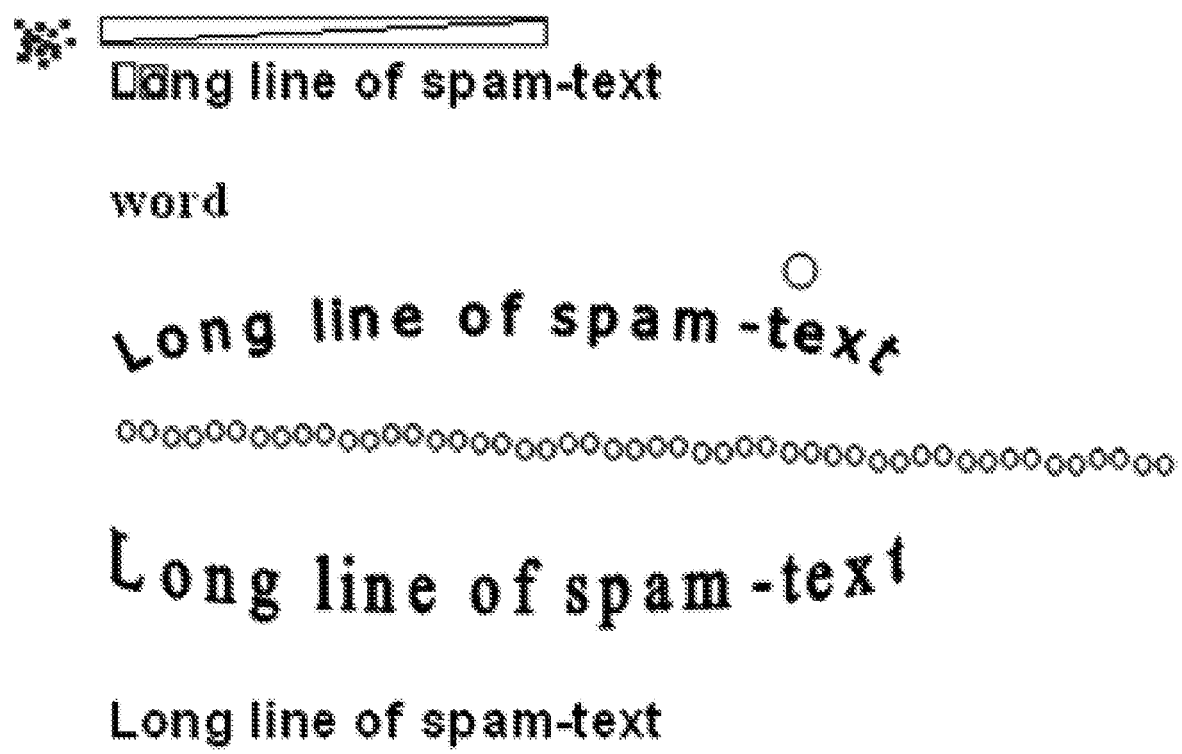
Figure 23:
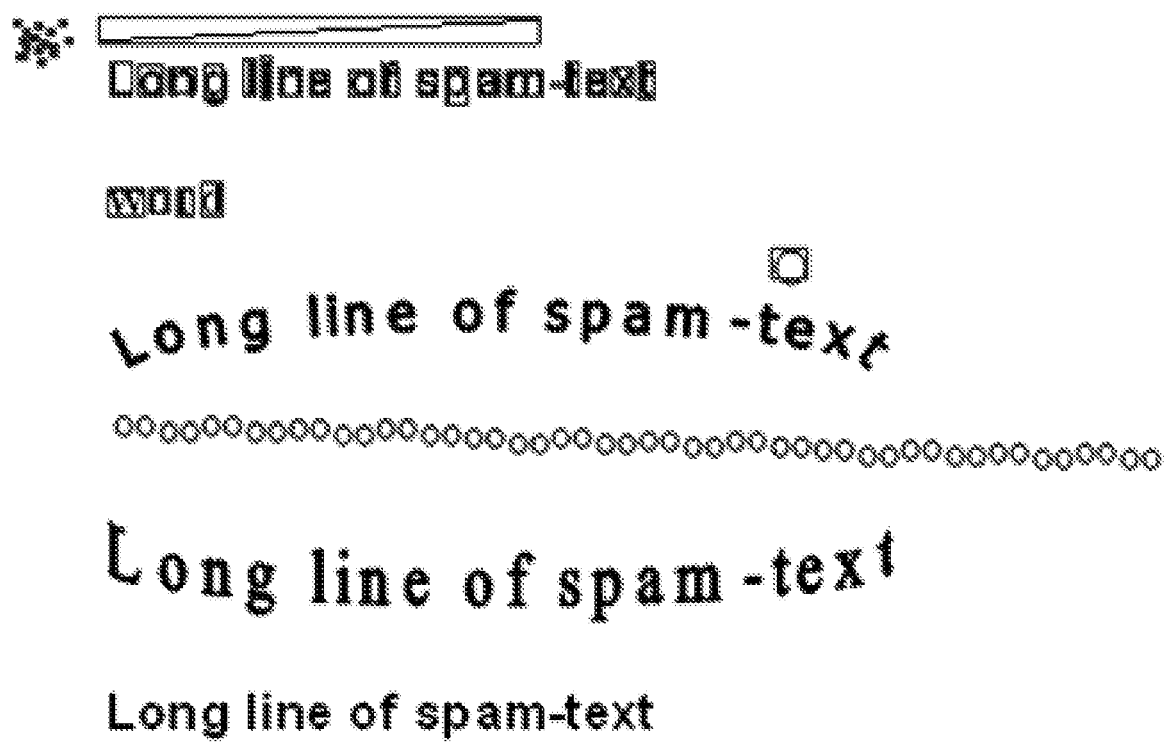
Figure 24:
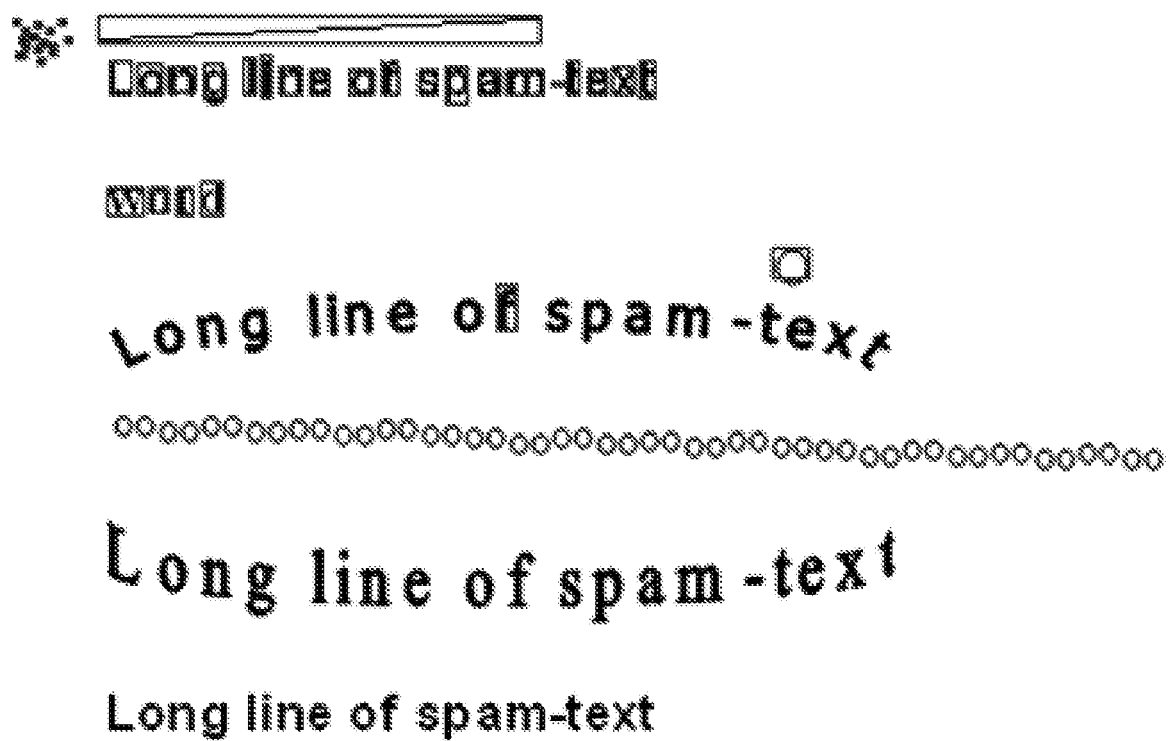
Figure 25:
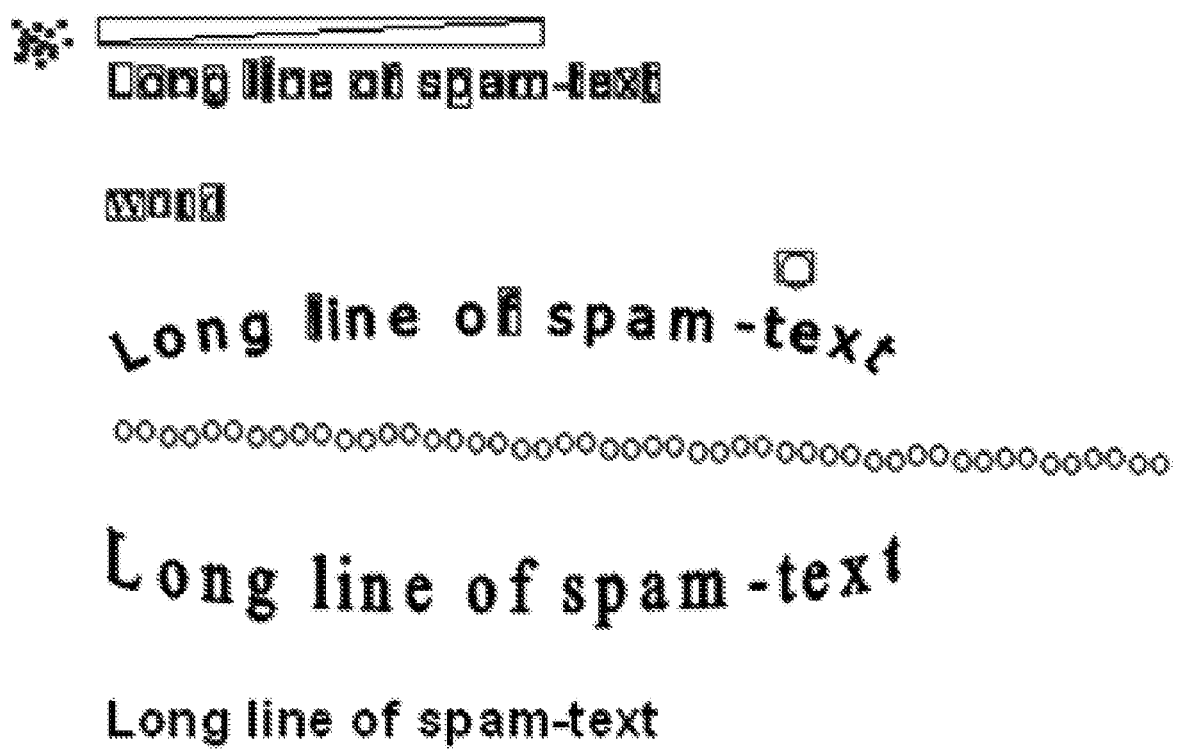
Figure 26:
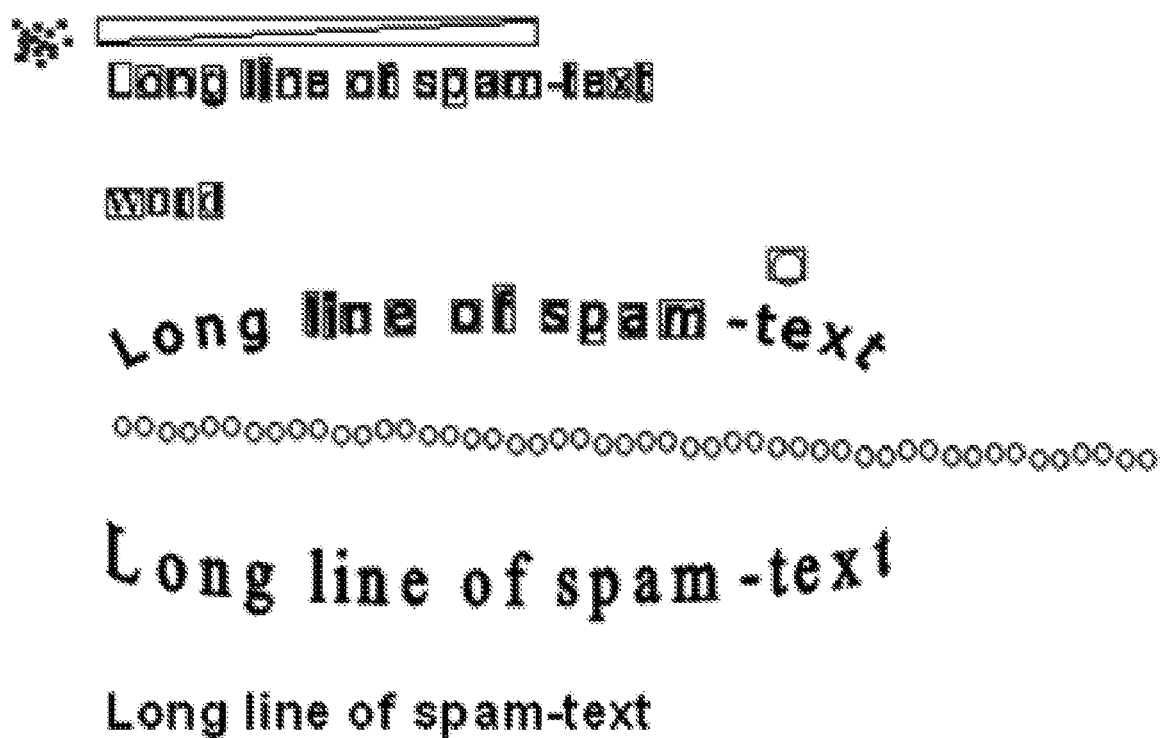
Figure 27:
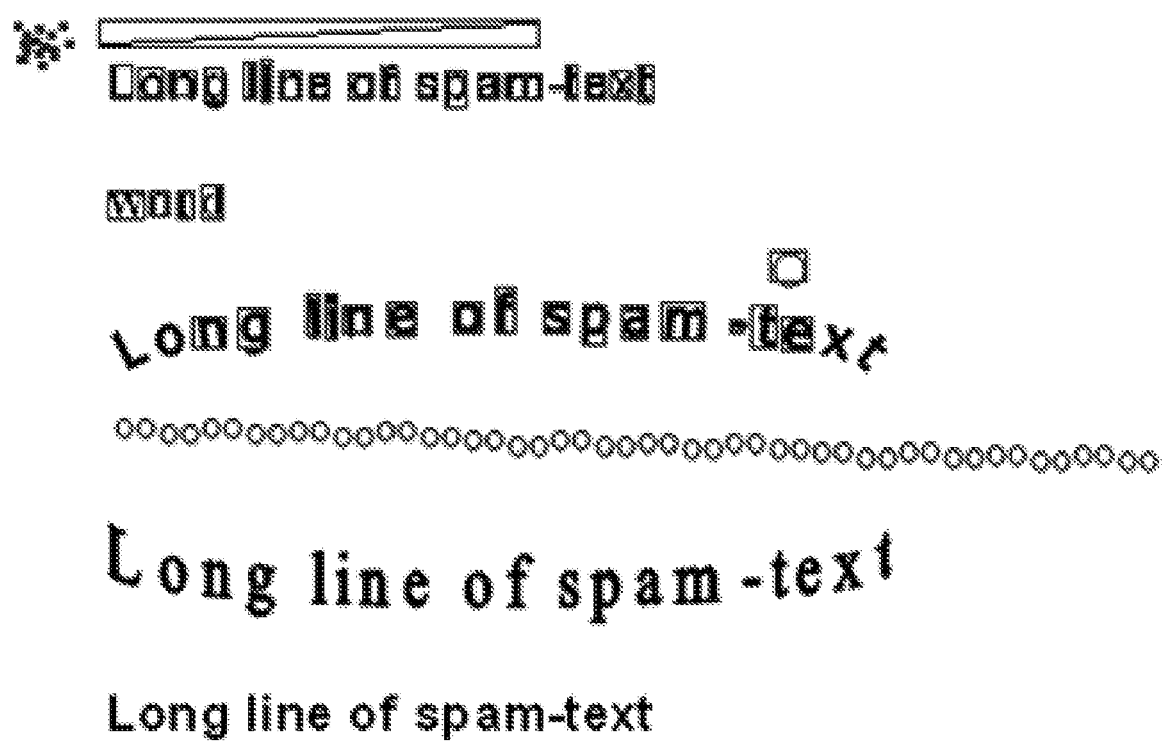
Figure 29:
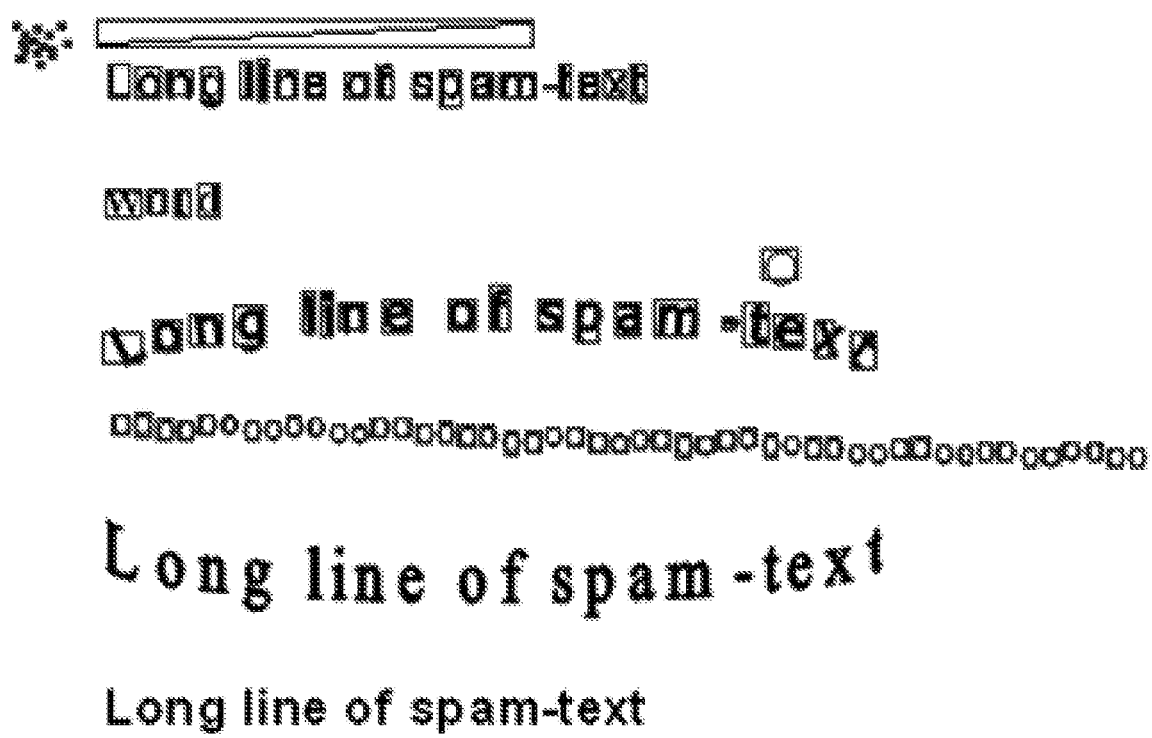
Figure 30:
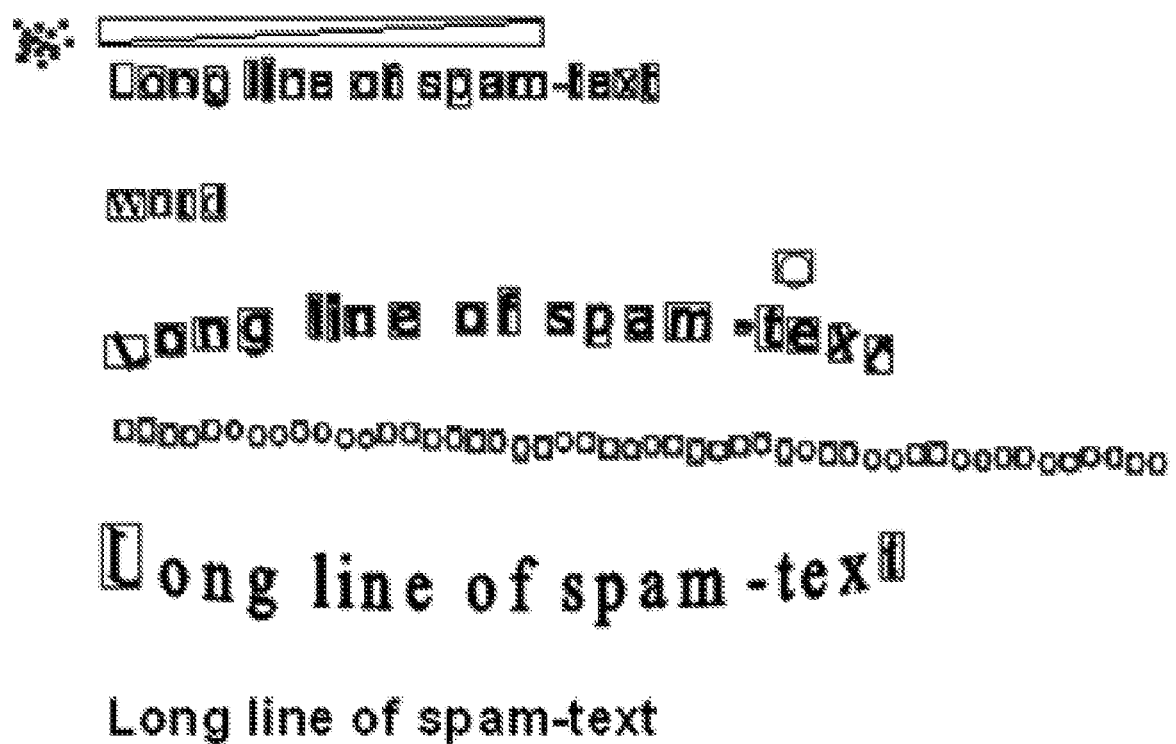
Figure 31:
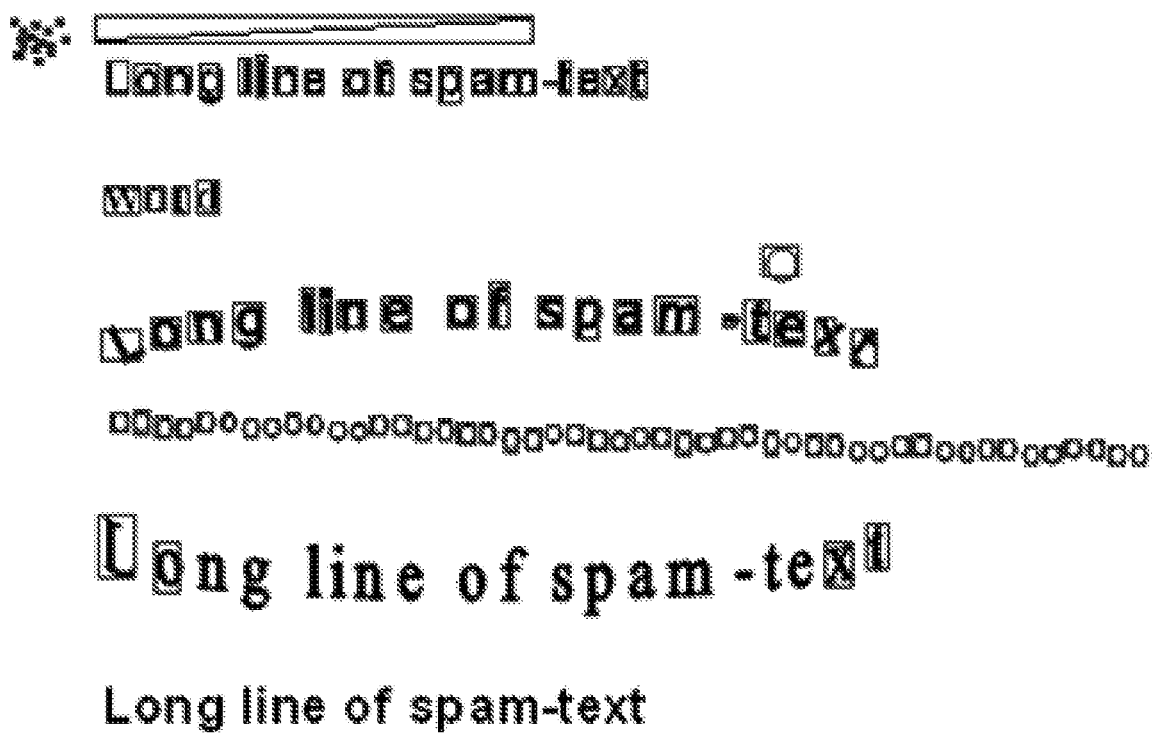
Figure 32:
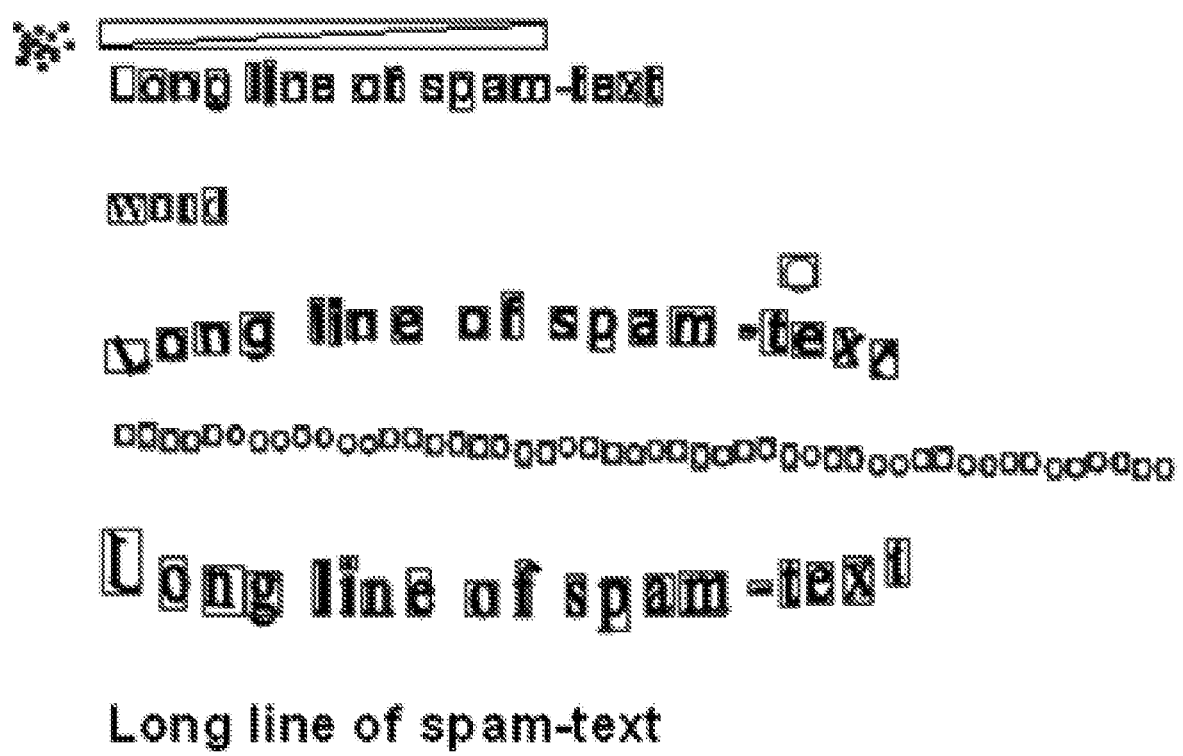
Figure 33:
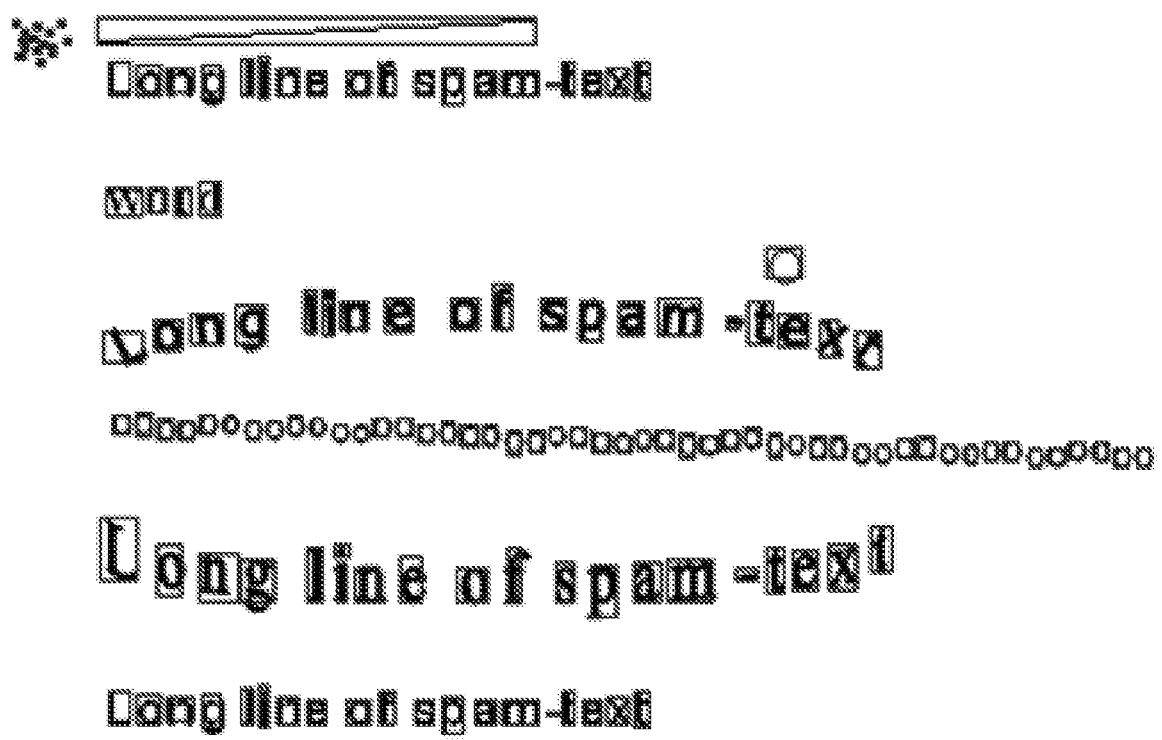
Figure 44:
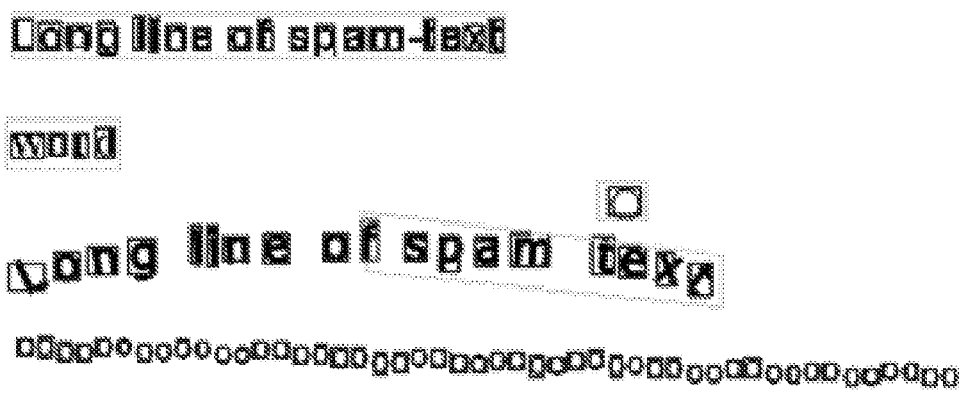
Figure 50:
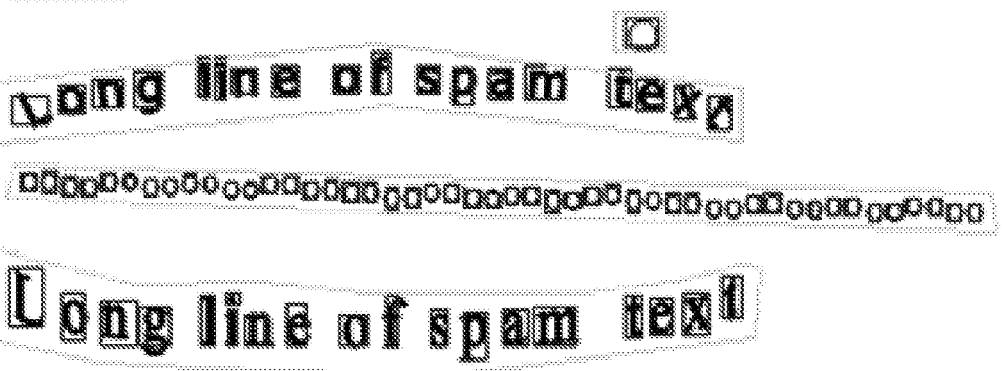
Figure 51:
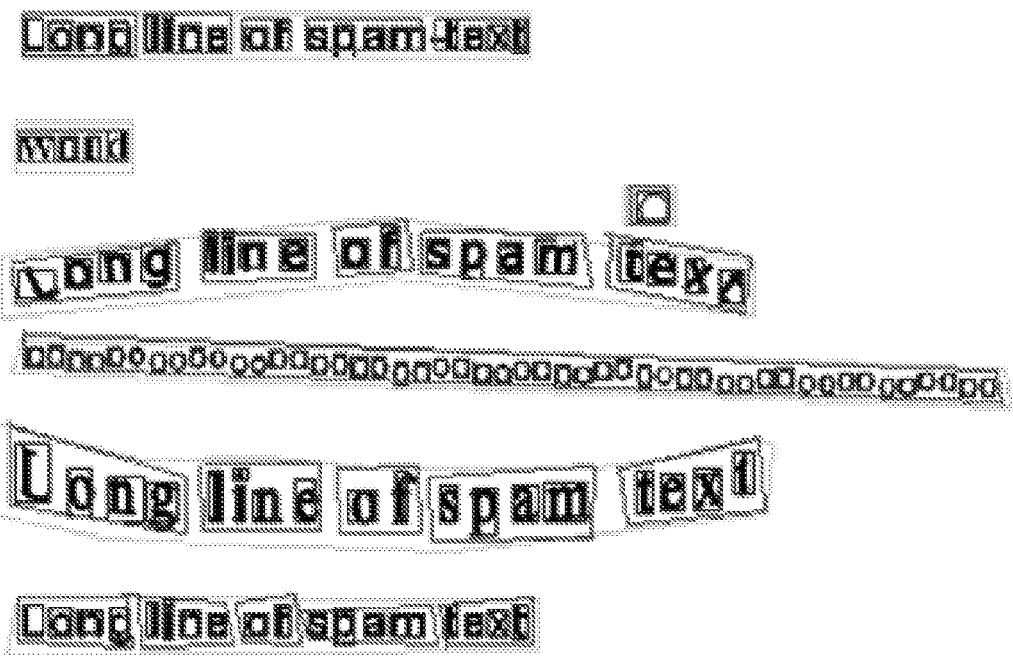
Figure 53:
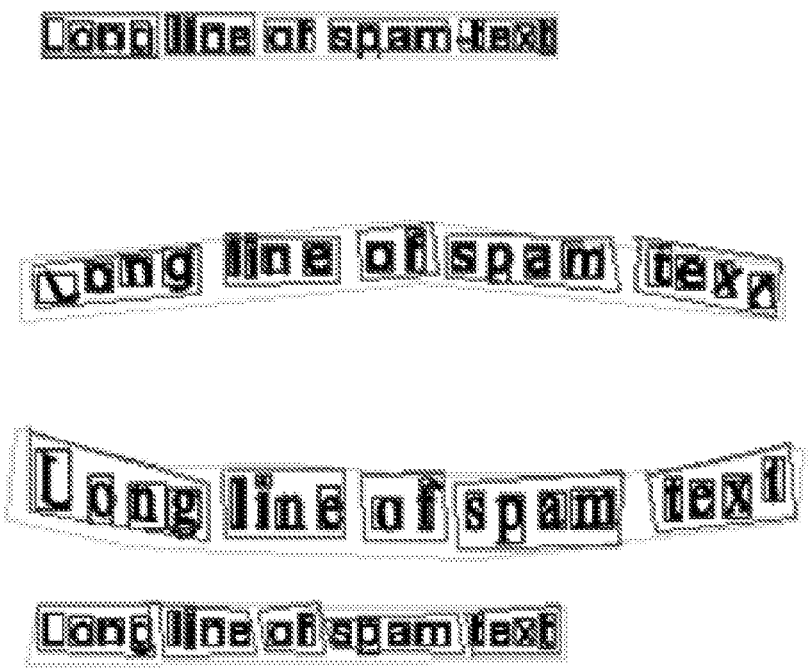
Figure 55:
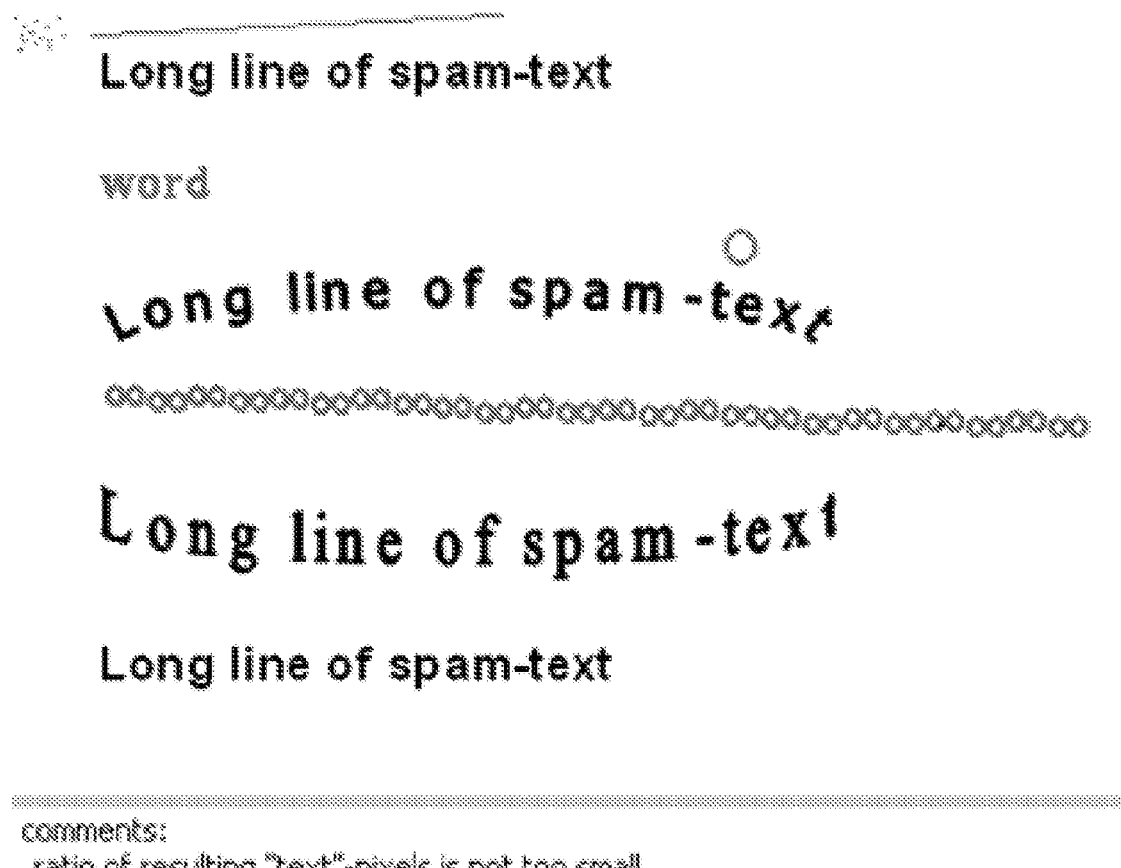

FIGS. 19 and 20 illustrate in detail the left-and-right threading steps of 1404 and 1405, with FIG. 19 showing the left threading, and FIG. 20 showing the right threading. These figures should be viewed with FIG. 17 in mind. As shown in FIG. 19, which is identical to FIG. 20 except for the left-right reversal, in step 1901, the top and bottom boundaries of the current contour are calculated. In step 1902, moving to the left, the algorithm looks for an adjacent contour. In FIG. 17, if the current contour corresponds to the letter N, then the adjacent contour would be the one that encloses the letter I in the word RAINBOW. In step 1903, if there is no contour found, then this is the end of that text line. If there is a contour found, then, in step 1904, the next contour (in this case, the contour for the letter I) will then become the current contour, see step 1905. The algorithm then returns to step 1901. A similar process takes place for right-threading (i.e., the "NBOW" part of RAINBOW). FIG. 56 is an another illustration of this process, showing that the process works equally well in both directions, regardless of which symbol the process starts with, and with a general indifference to various artifacts, such as wavy lines, text orientation, etc.

FIGS. 21-55 graphically additionally illustrate the process described earlier and with a commentary added to the figures to illustrate each step.

It should be remembered that conventional OCR algorithms are primarily intended to work on "friendly" documents—such as ordinary pages of text, faxes, scans of text documents and so on—in other words, the documents that were originally "documents" to which nobody has deliberately attempted to add artifacts designed to defeat OCR software. Spammers, on the other hand, are well aware that many mail service providers run attachments and other types of images through anti-SPAM filters that can include OCR. Therefore, such SPAM images, as noted earlier, are deliberately altered to defeat conventional OCR software. The spammer needs only to add enough artifacts to the image to decrease the reliability of the OCR software to a low enough point (it does not need to be zero), so that the mail service provider will let the SPAM image through rather than risk a false positive. Such artifacts can include writing text in wavy or curved lines, writing some text at an angle, but not another, at an angle, writing some letters, but not different, at an angle, adding various backgrounds, random patterns, and so on, and varying the spacing between the letters. As is well known by most users of OCR software, even for a very "clean" and "friendly" image, OCR software still often gives less than 100% reliability. For images that have been deliberately designed with anti-SPAM OCR defense in mind, the reliability of such OCR software is often low enough and cannot be relied upon.

On the other hand, using the approach described herein, most of artifacts added by spammers would not affect the reliability of SPAM detection. For example, in a situation where two letters of a word are deliberately spaced very close to each other, the conventional OCR software might be defeated by this—it might regard the two letters as a single letter and fail to recognize it altogether, or recognize it falsely. In the present invention, such a phenomenon would not present a problem, since very likely there will be a signature in the database that will correspond to the same image known to be SPAM. Regardless of whether the two letters in the image are treated as a single contour, or as two separate contours, the signature, constructed for the anti-SPAM database will be the same as in the image being analyzed—therefore a correct identification of the individual contours (versus aggregating two very closely spaced letters or symbols into a single contour) is not critical—SPAM would still be recognized as SPAM, based on having the same signature—without need to know what the exact in the image actually is.

Also, writing text in wavy lines, or curved lines, or orienting different letters and/or words at different angles does not present a particular problem with the approach described herein—in the example of the word "RAINBOW" described earlier, the contours of the letters corresponding to the word would still be recognized and the entire word would be recognized as a sequence of 7 symbols, notwithstanding the fact that the letters are written in a curved line. In other words, it is not the content of the symbols that are within the contours per se, but their relative relationship to each other—and the relative relationship to each other is much more difficult for the spammer to defeat using known tricks.

It will also be appreciated that many of the parameters discussed above can be set at the run time or can be made either fixed or variable. For example, a word considered neither too short nor too long can be a word that is between 2 and 16 symbols long—however, this is based on empirical observation, and there is nothing magic about this number. Different limits and parameters can be set for images that are already suspected of being SPAM, as opposed to an image about which nothing is known in advance. For instance, where there is a reason to suspect that a particular image contains SPAM (either based on some other form of preliminary analysis or based on information about the sender, or based on, for example, image size and dimensions), the danger of a false positive is presumably less, which the higher the ratio of N1/N2, the more probable is a "no SPAM" verdict. On the other hand, if it is found that the number of false positives is higher than expected, then various parameters, such as those discussed with reference to FIG. 1, can be tweaked as needed.

Note that in the case of images that are already in a rasterized form, step 101 is unnecessary, and, the remainder of the algorithm is the same. Also note that for an image that is received in a black and white form (or any other two-color form), step 102 need not be performed.

It will be appreciated that many of the visual and mathematical constructs discussed herein are primarily of use as an aid to understand the algorithm. In fact, it is unnecessary, for example, to construct the histogram of FIG. 12 actually—in a real-life system, only the final result matter and not the intermediate visualization aids. Similarly, there is no need to create an actual image with the "filled-in" contours—an equivalent data representation will also suffice.

Figure 7:
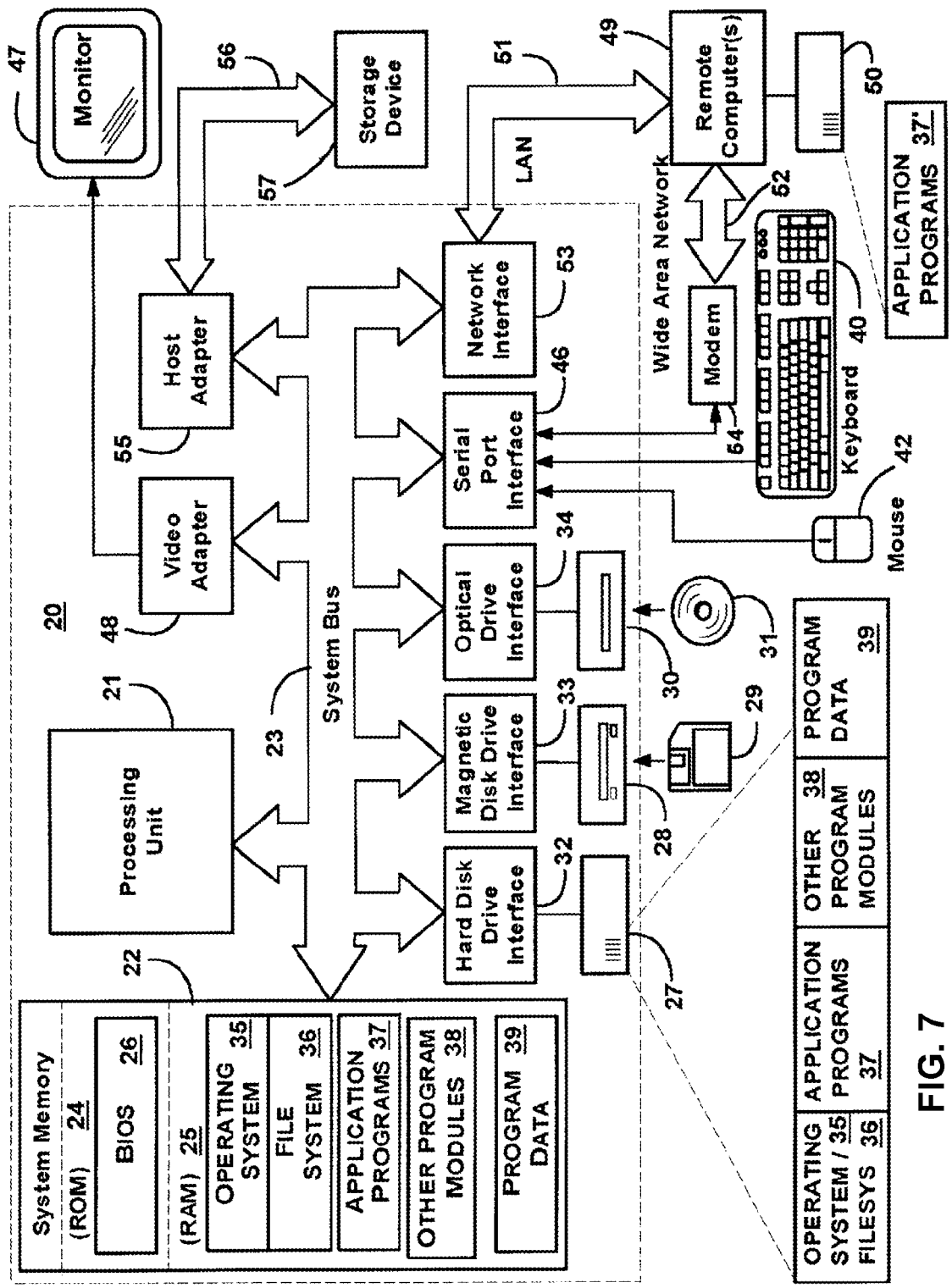
FIG. 7 illustrates an exemplary computer system on which the invention may be implemented.

With reference to FIG. 7, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide a non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 20 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 20, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described a preferred embodiment, the inventor makes it apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A computer-implemented method for identifying spam in an image, the method comprising:
(a) identifying a plurality of contours in the image, the contours corresponding to probable symbols;

(b) ignoring contours that are too small;
(c) identifying text lines in the image, based on the remaining contours;
(d) parsing the text lines into words;
(e) ignoring words that are too short from the identified text lines;
(f) ignoring text lines that are too short;
(g) verifying that the image contains text by comparing a number of pixels of a symbol color within remaining contours to a total number of pixels of the symbol color in the image; and
(h) rendering a spam/no spam verdict based on a contour representation of the text that remains after step (f).

2. The method of claim 1, further comprising convening the image from a vector form to a raster form, prior to step (a).

3. The method of claim 1, further comprising converting the image from a multi-color form to a two-color form, prior to step (a).

4. The method of claim 3, further comprising identifying one color of the two colors as a background color, and the other color as the symbol color.

5. The method of claim 4, further comprising generating a spectral distribution of the two-color image, and setting a threshold between the two colors at a level $X2+\frac{3}{4}(X1-X2)$, $X1$ being a center of mass of the spectral distribution, and $X2$ being a first used color in the spectral distribution.

6. The method of claim 4, wherein identification of each contour comprises identifying a first pixel of the symbol color, defining the contour as the first pixel, and then repeatedly expanding the contour in those directions where adjacent pixels are also of the symbol color.

7. The method of claim 1, further comprising, in step (d), for each contour, identifying contours that are within $2X_{im}$ of the contour as belonging to a suspected word, wherein $X_{im}$ is a most frequent distance between all the adjacent contour pairs in all text lines.

8. A non-transitory computer useable recording medium having computer executable program logic stored thereon for executing on a processor, the program logic comprising computer program code for implementing the steps of claim 1.

9. A system for identifying spam in an image based on the method of claim 1, the system comprising:
 a processor;
 memory; and
 computer code loaded into the memory for executing on the processor, for implementing the steps of claim 1.

10. A computer-implemented method for identifying text in an image, the method comprising:
(a) identifying a plurality of contours in the image, the contours corresponding to probable symbols, each contour forming a closed boundary around each probable symbol;
(b) for each contour, identifying adjacent contours that are within $2X_{im}$ of the contour, to the left and right, as belonging to the same text line, wherein $X_{im}$ is a most frequent distance between all adjacent contour pairs in all text lines;
(c) identifying text lines in the image, based on the adjacent contours, wherein adjacent contours belong to the same text line;
(d) ignoring text lines that are too short and parsing the remaining text lines into words; and
(e) identifying presence of text in the image based on the words.

11. A system for identifying spam in an image based on the method of claim 10, the system comprising:
 a processor;
 memory; and
 computer code loaded into the memory for executing on the processor, for implementing the steps of claim 10.

12. A non-transitory computer useable recording medium having computer executable program logic stored thereon for executing on a processor, the program logic comprising computer program code for implementing the steps of claim 10.

* * * * *

UNITED STATES PATENT AND TRADEMARK OFFICE
CERTIFICATE OF CORRECTION

| | | |
|---|---|---|
| PATENT NO. | : 7,706,614 B2 | Page 1 of 1 |
| APPLICATION NO. | : 12/025697 | |
| DATED | : April 27, 2010 | |
| INVENTOR(S) | : Evgeny P. Smirnov | |

It is certified that error appears in the above-identified patent and that said Letters Patent is hereby corrected as shown below:

On the Title Pg, Item (75) in the inventor's name, replace "Evgegy" with --Evgeny--.

Signed and Sealed this

Fifteenth Day of June, 2010

David J. Kappos
*Director of the United States Patent and Trademark Office*